US011330865B2

(12) United States Patent
Wang et al.

(10) Patent No.: US 11,330,865 B2
(45) Date of Patent: May 17, 2022

(54) OPTIMIZED THREE DIMENSIONAL PRINTING USING READY-MADE SUPPORTS

(71) Applicant: MATERIALISE NV, Leuven (BE)

(72) Inventors: Mingzheng Wang, Leuven (BE); Jan Welkenhuyzen, Leuven (BE); Bart Van Der Schueren, Leuven (BE)

(73) Assignee: Materialise NV, Leuven (BE)

( * ) Notice: Subject to any disclaimer, the term of this patent is extended or adjusted under 35 U.S.C. 154(b) by 593 days.

(21) Appl. No.: 16/092,754

(22) PCT Filed: Apr. 14, 2017

(86) PCT No.: PCT/US2017/027559
§ 371 (c)(1),
(2) Date: Oct. 10, 2018

(87) PCT Pub. No.: WO2017/180958
PCT Pub. Date: Oct. 19, 2017

(65) Prior Publication Data
US 2020/0329814 A1 Oct. 22, 2020

(30) Foreign Application Priority Data

Apr. 15, 2016 (CN) .......................... 201610230614.8
Apr. 15, 2016 (CN) .......................... 201610230615.2

(51) Int. Cl.
*A43B 17/00* (2006.01)
*B29C 64/118* (2017.01)
(Continued)

(52) U.S. Cl.
CPC .......... *A43B 17/006* (2013.01); *B29C 64/118* (2017.08); *B29C 64/188* (2017.08);
(Continued)

(58) Field of Classification Search
CPC ... B29L 2031/507; B33Y 10/00; B33Y 30/00; B33Y 80/00; B29K 2105/08;
(Continued)

(56) References Cited

U.S. PATENT DOCUMENTS 10,034,622 B1*   7/2018   Mahmoud ............... A61B 5/112
2004/0168357 A1*  9/2004   Meibock ............... A43B 1/0072
                                                           36/115
(Continued)

FOREIGN PATENT DOCUMENTS

WO        2014/014977 A2    1/2014
WO        2017007536 A1    1/2017

OTHER PUBLICATIONS

International Search Report and Written Opinion—PCT/US2017/027559—International Searching Authority—European Patent Office—dated Nov. 17, 2017, 20 pages.
(Continued)

*Primary Examiner* — Camie S Thompson
(74) *Attorney, Agent, or Firm* — Patterson + Sheridan, LLP

(57) ABSTRACT

Systems and methods for supporting an object to be printed in an additive manufacturing process are disclosed. Support structures (202, 302, 402, 502, 602) are prefabricated and positioned in the build area of a 3D printing device prior to printing the 3D object. When the object has been printed, the support is removed and can be reused to print another object by repositioning the support structure in the building area of the additive manufacturing device.

18 Claims, 25 Drawing Sheets

(51) Int. Cl.

| | |
|---|---|
| *B29C 64/188* | (2017.01) |
| *B29C 64/245* | (2017.01) |
| *B29C 64/393* | (2017.01) |
| *B29C 64/40* | (2017.01) |
| *B29C 64/205* | (2017.01) |
| *B33Y 10/00* | (2015.01) |
| *B33Y 30/00* | (2015.01) |
| *B33Y 80/00* | (2015.01) |
| *B29K 105/08* | (2006.01) |
| *B29K 307/04* | (2006.01) |
| *B29L 31/50* | (2006.01) |

(52) U.S. Cl.
CPC .......... *B29C 64/205* (2017.08); *B29C 64/245* (2017.08); *B29C 64/393* (2017.08); *B29C 64/40* (2017.08); *B29K 2105/08* (2013.01); *B29K 2307/04* (2013.01); *B29L 2031/507* (2013.01); *B33Y 10/00* (2014.12); *B33Y 30/00* (2014.12); *B33Y 80/00* (2014.12)

(58) Field of Classification Search
CPC .............. B29K 2307/04; B29D 35/142; A43B 17/006; A43B 23/086; A43B 23/087; A43B 7/141; A43B 7/28; A43B 7/049; A43B 17/003; B29C 64/393; B29C 64/40; B29C 64/188; B29C 64/245; B29C 64/118; A43D 1/025; A43D 1/08; A43D 7/141; A43D 7/28; A43D 7/049
USPC .................... 36/115, 43, 45, 24.5; 428/292.1
See application file for complete search history.

(56) References Cited

U.S. PATENT DOCUMENTS

| | | |
|---|---|---|
| 2015/0040428 A1 | 2/2015 | Davis et al. |
| 2015/0266235 A1 | 9/2015 | Page |

OTHER PUBLICATIONS

James Page: "topolabs web video 2 3D printing non planar FDM", You Tube, Apr. 4, 2014, XP054977699, Retrieved from the Internet: URL:htps://www.youtube.com/watch?v=Qkwkk1S-_Ek.

* cited by examiner

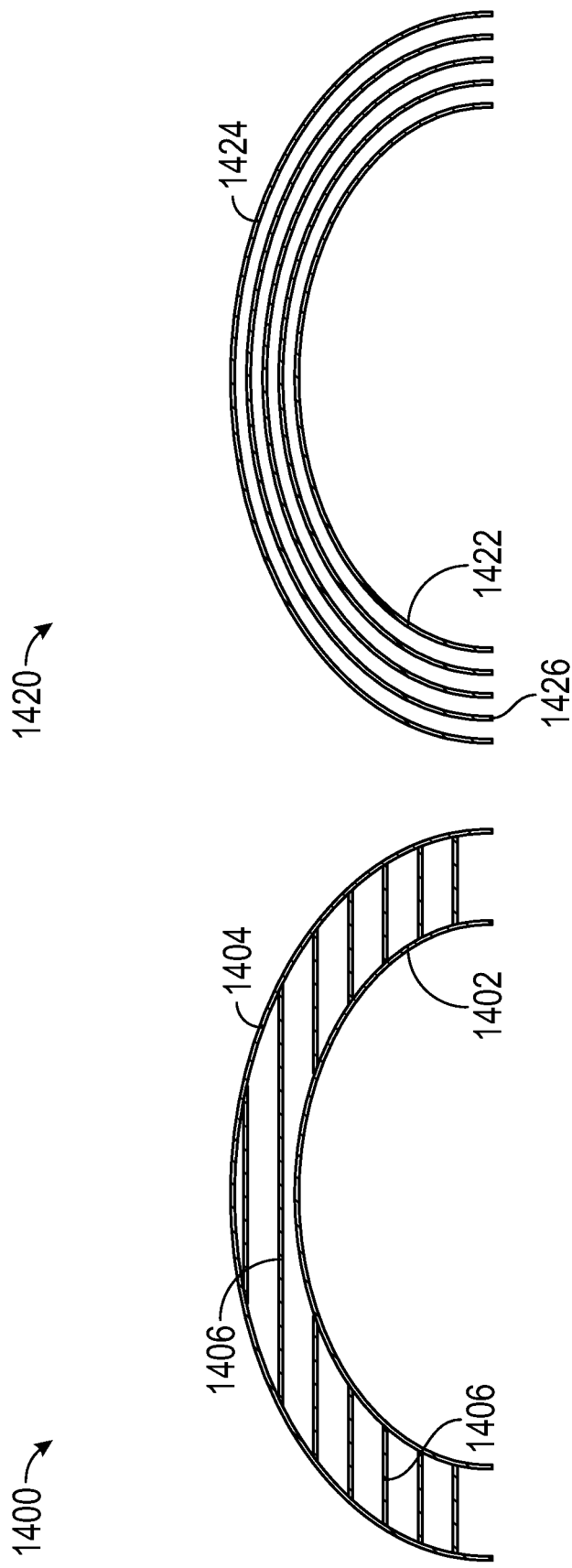

OPTIMIZED THREE DIMENSIONAL PRINTING USING READY-MADE SUPPORTS

CROSS-REFERENCE TO RELATED APPLICATIONS

The present application is a 371 filing of PCT/US2017/027559, filed Apr. 14, 2017, which claims the benefit of Chinese Patent Application No. 201610230614.8, filed Apr. 15, 2016, titled OPTIMIZED THREE DIMENSIONAL PRINTING USING READY-MADE SUPPORTS This application further claims the benefit of and Chinese Patent Application No. 201610230615.2, filed Apr. 15, 2016, titled CUSTOMIZED CUSHIONING THROUGH CONFORMAL PRINTING. The content of each of the patent applications are hereby incorporated by reference in their entirety.

BACKGROUND OF THE INVENTION

Field of the Invention

This application relates to 3D printing of objects. More particularly, this application relates to systems and methods for designing, creating, using, and reusing supports to create objects using 3D printing. Further, this application relates to systems and methods for avoiding inter-layer weakness in cushioning objects such as, but not limited to, insoles or seat cushions created using 3D printing technologies.

Description of the Related Technology

When objects are printed using 3D printers, they often include areas which are not self-supporting as they are printed. These areas are often referred to as overhangs. In general, overhangs are those areas in the object which, due to their angle will either break or droop because they lack sufficient support from the preceding layer. In current 3D printing applications, supports are typically added to the 3D model prior to printing, and their overhangs are printed along with the printed object. Once the object and support have been printed and the printing material has hardened or cured, the supports are removed or separated from the object.

Although the use of supports in 3D printing allows for the printing of objects having more complex structures and designs, it also suffers from certain drawbacks. Because the supports are printed along with the object, they tend to result in the use of a significant amount of excess material in the build process. This excess material can be costly, and in many cases cannot be reused or recycled. In addition, building the supports alongside the object also can extend the time it takes to print the object. In some cases, the time involved in building the support can exceed the time needed to actually manufacture the object itself. Accordingly, improved systems and methods for supporting objects during additive manufacturing are needed.

Further, in recent years, highly-customized cushioning such as footwear for example, has become more and more prevalent in the marketplace. In many implementations, customized footwear has been made possible through improvements in additive manufacturing technologies such as 3-D printing, for example. The customized footwear made possible through 3-D printing includes both insoles and shoes. These customized insoles and shoes are designed by taking a 3D scan of the foot of the wearer, and then creating a 3D model based on the shape and contours of the foot. The footwear item is then manufactured (e.g., 3D printed) in accordance with the model. By fitting the shoe or insole to the precise contours of the foot, a better fit and more comfort is provided.

Although 3D printed footwear provides certain advantages in terms of the comfort and fit for the wearer, 3D printed footwear can suffer from durability issues. In particular, because additive manufacturing involves creating objects in a layer-by-layer fashion, the finished objects can suffer from inter-layer weakness. In particular, in areas which are subject to significant stresses, the layers can separate or even break, degrading the structural integrity of the object. These issues can be especially acute in areas which include curved surfaces, of which there tend to be many in footwear. Attempts have been made at addressing inter-layer weakness through pre-processing (e.g., filament cleaning and/or drying) and post-processing (e.g., coating). Other attempted solutions have sought to reduce the problem by changing the build orientation of the footwear. However, none of these techniques has proven fully effective at preventing the problem. Accordingly, there is a need for highly-customized footwear that does not suffer from inter-layer weakness.

SUMMARY

In one embodiment, a method of supporting an object to be printed in an additive manufacturing process is provided. The method may include positioning a prefabricated support in a print area of an additive manufacturing device, wherein the prefabricated support is shaped to support the object to be printed. The method may further include printing the object to be printed on top of the prefabricated support. The support and the printed object may then be removed from the print area, and the printed object may be separated from the prefabricated support. The prefabricated support may then be repositioned in the print area of the manufacturing device.

In another embodiment, a build platform for an additive manufacturing device is provided. The build platform may comprise a plurality of height-adjustable beams. The height-adjustable beams are independently adjustable to generally conform to a predetermined shape of an object support.

Other embodiments disclosed herein relate to systems and methods which use conformal layers to avoid inter-layer weakness in cushioning objects such as footwear, head rests, and seat cushions made using additive manufacturing processes. In particular embodiments, curved-layer fused deposition modeling technology may be utilized to provide advantages such as smoother surface finishing, control over the flexibility, torsional rigidity, and shear strength in various parts of the objects which are customized not only to the anatomy of the user, but also may be customized for a specified activity. In some particular embodiments, the object may be an item of footwear produced using an additive manufacturing device. The item of footwear may comprise a plurality of curved layers conforming to a curved shape of an outer surface of the item of footwear.

In some embodiments, techniques for supporting an object as described with respect to certain embodiments may be used with systems and methods which use conformal layers to avoid inter-layer weakness in cushioning objects such as footwear, head rests, and seat cushions made using additive manufacturing processes as described with respect to certain embodiments.

BRIEF DESCRIPTION OF THE DRAWINGS

FIG. 14A illustrates an example of an item manufactured using traditional layering.

FIG. 14B provides an illustration of an item manufactured using curved layers.

DETAILED DESCRIPTION OF CERTAIN INVENTIVE EMBODIMENTS

Figure 1A:
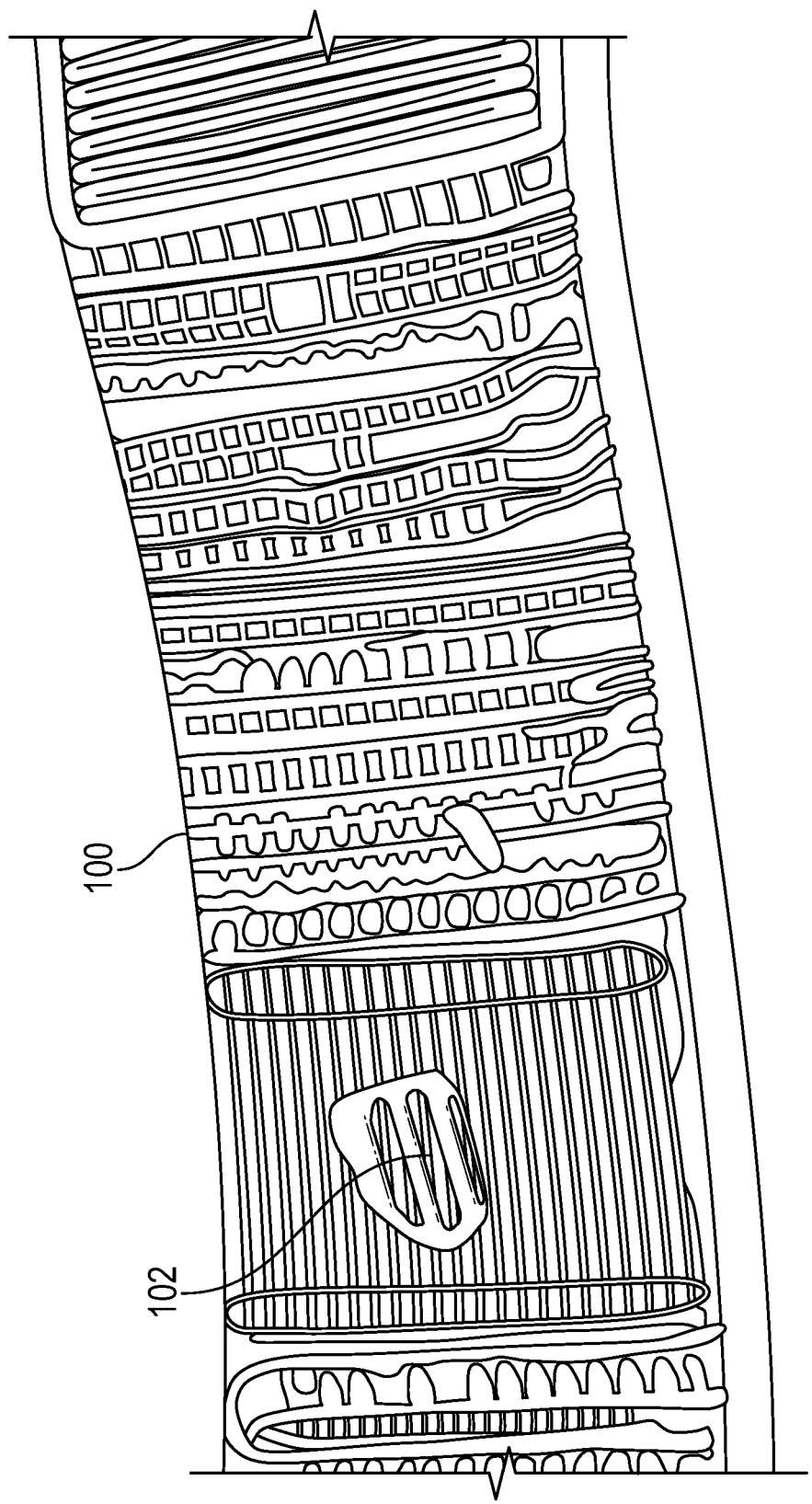
FIG. 1A is an example of a 3-D printed object that has been separated from conventional supports after the build process has completed.

Certain embodiments of this application relate to the use of prefabricated support structures in 3D printing. These supports may be full model contacting supports used in deposition and extrusion-based 3D printing techniques, supports which are ultimately removed from the finished object. In some embodiments, the supports may be scaffolds, lattices, or lightweight structures, or other support configurations known in the art. By manufacturing and utilizing prefabricated support structures, several benefits to the 3D printing process are realized. For example, utilizing the prefabricated supports disclosed herein results in reduced or even eliminated waste of materials. This savings of materials results from the ability for the prefabricated supports to be used to manufacture multiple parts instead of only a single part. The prefabricated supports may also improve the performance and use of single nozzle 3D printers. This is because the use of prefabricated supports allows a single-nozzle printer to extrude different materials for the model and the support. Because the support and the object are not printed at the same time, the appropriate material can be selected for each. By utilizing different materials for the support and the object itself, the support and the model do not need to be printed in a single build process. Because they can be printed in separate build processes, a separating layer may be inserted between the support and the model which makes it easier to separate them after the object has been printed. In addition, some embodiments relate to the use of supports which form substrates upon which an object is manufactured. These substrates may also be prefabricated supports structures which are integrated into the manufactured object (as opposed to being separated from the object as is the case in traditional supports).

Certain embodiments of this application relate to systems and methods which use conformal layers to avoid inter-layer weakness in objects made using additive manufacturing processes. In particular, curved-layer fused deposition modeling technology may be utilized to provide advantages such as smoother surface finishing, control over the flexibility, torsional rigidity, and shear strength in various parts of the object which are customized not only to the anatomy of the user, but also may be customized for a specified activity. In various embodiments, the objects may include items of footwear such as insoles or midsoles. In other embodiments, the objects may be seat cushions or head rests. In general, the inventive embodiments disclosed herein may be utilized in connection with various types of customized cushioning or objects with curved surfaces, such as those designed based on anatomical characteristics of the user. In certain embodiments, systems and methods which use conformal layers to avoid inter-layer weakness in objects made using additive manufacturing processes may further utilize prefabricated support structures as discussed herein. For example, the prefabricated support structure may include a curved surface corresponding to a curved surface of an object to be manufactured, and conformal layers may be used to form the object on the prefabricated support structure. In certain aspects, "curved surfaces" may refer to all kinds of curved surfaces including, but not limited to, ruled surfaces, single curved surfaces, double curved surfaces, non-uniform rational basis splines (NURBS), etc. For example, a curved surface may be curved with respect to the Z axis (e.g., perpendicular to a build platform), may be curved with respect to the Z-axis and curved with respect to one or more of the X-axis and Y-axis (e.g., curved in the X-Y plane), curved with respect to one or more of the X-axis and Y-axis (e.g., curved in the X-Y plane), etc.

Figure 1B:
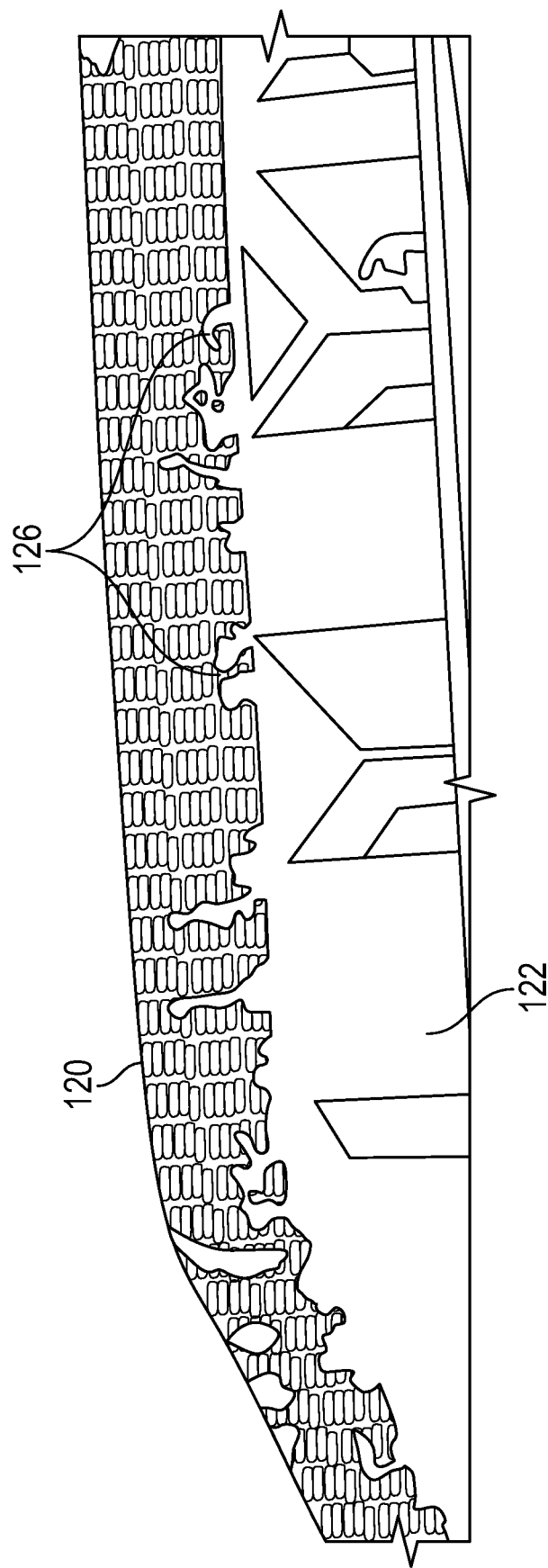
FIG. 1B is an example of a 3-D printed object printed using a dual nozzle printer with its support still attached.

FIGS. 1A and 1B provide examples of some of the shortcomings in the current uses of supports which have been identified by the inventors. FIG. 1A is an example of an object 100 printed using an additive manufacturing device. This particular object 100 was printed using object supports in a fused deposition modelling ("FDM") process. As is known in the art, an FDM process constructs three-dimensional objects directly from 3D CAD data. A temperature-controlled head extrudes thermoplastic material layer by layer. A typical FDM process starts with importing an STL file of a model into a pre-processing software. This model is oriented and mathematically sliced into horizontal layers varying from +/−0.01-50 mm thickness. A support structure is created where needed, based on the position and geometry of the part. After reviewing the path data and generating the toolpaths, the data is downloaded to the FDM machine which prints the object.

An FDM printer typically operates in X, Y and Z axes, drawing the model one layer at a time. This process is similar to how a hot glue gun extrudes melted beads of glue. The temperature-controlled extrusion head is fed with thermoplastic modeling material that is heated to a semi-liquid state. The head extrudes and directs the material with precision in ultrathin layers onto a fixtureless base. The result of the solidified material laminating to the preceding layer is a plastic 3D model built up one strand at a time. Once the part is completed, the support columns are removed and the surface is finished.

In the example shown in FIG. 1A, the supports have been removed from the object, but the removal of the support was not complete. Thus, the support has left a considerable amount of residue 102, which detracts from both the appearance and the quality of the finished object. Although this residue may be removed using post-processing such as sanding, for example, it illustrates one difficulty in utilizing object supports which are made from the same material as the manufactured object. In addition, using the same material for support and object makes it more difficult to remove the support. In some cases, the support may not be able to be removed at all—especially where the support contacting area is quite large and flat. In order to avoid large and flat contacting areas, to ensure that the support can be removed from the object, the contact area may be reduced. But in these instances, the surface quality of the supported area often decreases dramatically.

FIG. 1B is an example of another problematic object built using conventional support techniques. In this example, the object 120 has been built using a dual-nozzle device. The dual nozzle device built the support 122 using a first material. The object 120 is built using a second material. Although the use of different materials may make the separation of the support from the object easier, there are drawbacks with this technique as well. First, the dual-nozzle printer is more expensive and more complex to operate. This expense and complexity can make it difficult for less sophisticated users to print objects using supports. Moreover, material can trickle or seep out of one nozzle and interfere with the material extruded from the other nozzle as shown in FIG. 1B. In this particular example, the material used to make the support has seeped into the object itself. This seeped material 126 negatively impacts the appearance and quality of the finished object.

In addition to the shortcomings identified by the inventors as shown in FIGS. 1A and 1B, the inventors have recognized additional deficiencies. For example, some support generation techniques seek to reduce the volume of the support as much as possible to save time and material. However, the more the volume of the support is reduced, the greater the risk that the support will fail, resulting in a failed build process. Some techniques also seek to reduce the density of the support in order to save material and time. A reduction in density also leads to a weaker support and reduced quality of the support in how conventional supports are used in 3D printing. Recognizing these problems, the inventors conceived of a new approach to generating and using supports.

Figure 2:
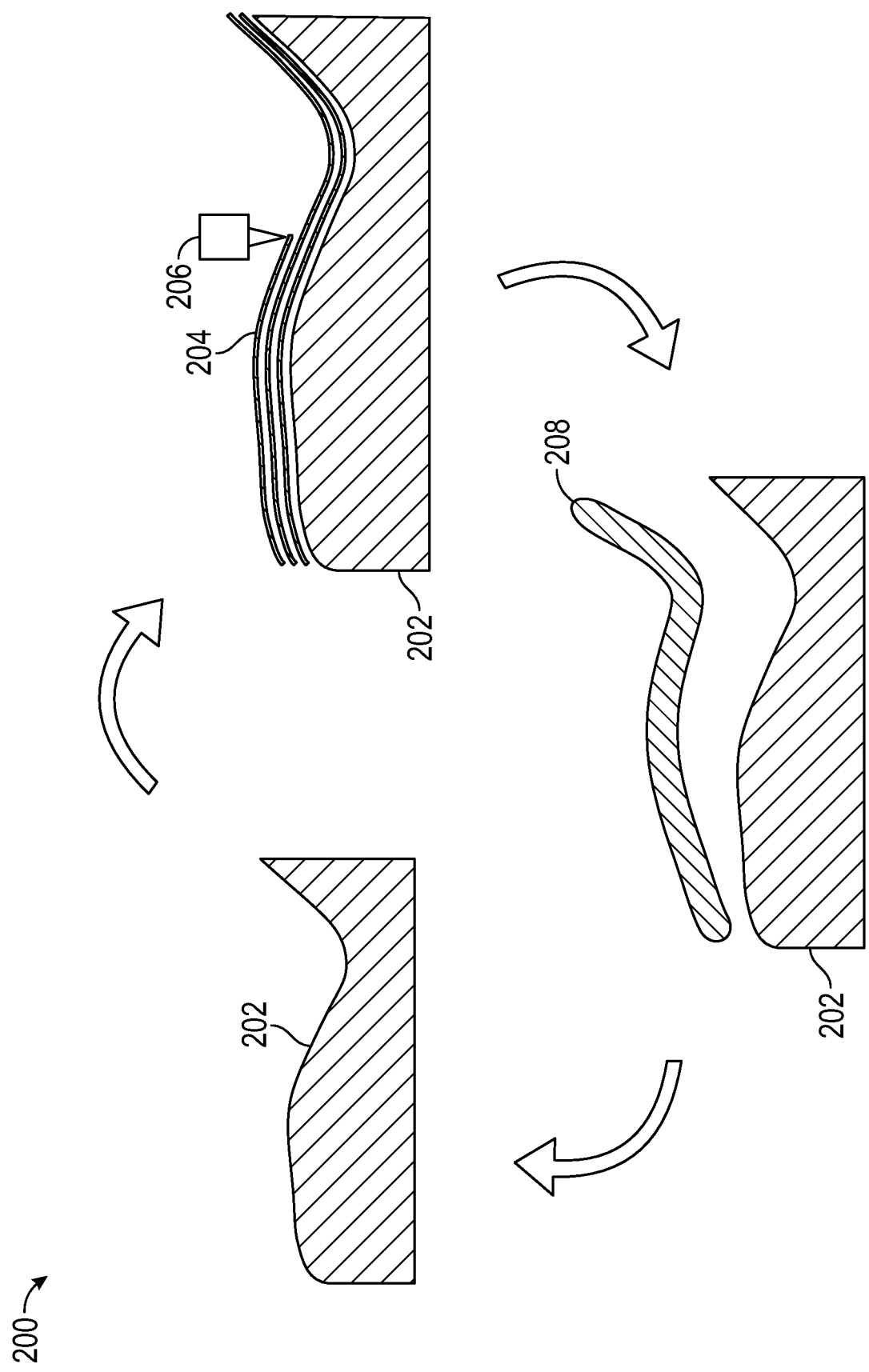
FIG. 2 is an illustration of how the prefabricated support may be used to produce an object using additive manufacturing according to certain embodiments of the invention.

FIG. 2 provides a high level illustration of this new approach. In particular, FIG. 2 shows a high level process 200 by which a prefabricated support can be used to build an object using additive manufacturing, and also to remove the built object from the support when the build process is complete. A prefabricated/predefined support 202 is manufactured based on the design of the object/model to be printed. As will be discussed in detail below, the prefabricated support 202 may take various forms and be manufactured using various manufacturing methods. In some embodiments, the prefabricated support 202 may be manufactured using an additive manufacturing device such as a 3D printer. In these implementations, the prefabricated support may be manufactured in accordance with a support structure generated which is based directly on the shape and structure of the object to be printed. In other implementations, the prefabricated support may be manufactured using conventional manufacturing methods.

As illustrated in FIG. 2, the predefined support 202 may be formed and placed in the additive manufacturing device. The object to be built may be manufactured as a series of layers 204 deposited on top of the support 202. Depending on the type of additive manufacturing device used, layers may be deposited using an extrusion device 206 such as a print nozzle. Alternatively, where the additive manufacturing device utilizes powder melting or liquid curing, the layers may be formed using laser scanner or other similar technology. Once the extrusion device 206 has completed depositing layers to build the finished model, the model 208 may be removed from the support 202 as shown. In the use of conventional supports, at this stage the support would typically be discarded. According to certain embodiments, the support 202 may be reinserted into the machine and used again to manufacture another identical and/or similar object. This process can be repeated time and time again, each time saving considerable material and time during the build process because the support need not be re-created.

In certain embodiment, as discussed, substrates may also be prefabricated supports structures which are integrated into the manufactured object (as opposed to being separated from the object as is the case in traditional supports). Accordingly, in certain aspects, once the extrusion device 206 has completed depositing layers the finished model may include both model 208 and support 202 integrated together. The finished model including model 208 and support 202 may be removed from the additive manufacturing device. In certain embodiments, another predefined support 202 may be formed and placed in the additive manufacturing device for building another object.

Figure 3:
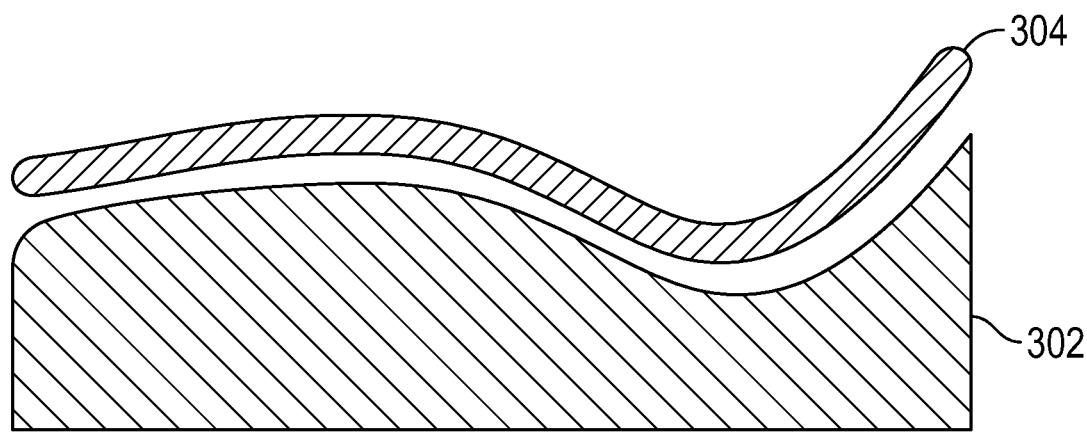
FIG. 3 is an illustration of an object that has been printed using a prefabricated support according to one or more embodiments.

Turning now to FIG. 3, an example of a static prefabricated support 302 with a completed object 304 is shown. The static prefabricated support 302 may generally be any type of support structure capable of providing necessary support to an object as it is manufactured within an additive manufacturing device. The static prefabricated support 302 may be manufactured using 3-D printing, tooling, vacuum casting, injection molding, or any other manufacturing technology. The static prefabricated support 302 may be made from various materials, including plastic, metal, wood, or other material.

In this example of the static prefabricated support 302, the support has been placed in a specific position on the build platform of the additive manufacturing device. This position is determined based on the design file associated with the object to be built. Once the prefabricated support 302 has been appropriately placed on the build platform, the additive manufacturing device may then begin the process of depositing and/or creating layers of the object 304 until the object has been completed. Thus, the use of static prefabricated supports such as support 302 may be beneficial in situations where multiple objects need to be produced, but it is impractical or cost prohibitive to create a mold or cast to manufacture the object (such as object 304) using conventional manufacturing methods. By utilizing the static prefabricated support 302, a significant amount of time and material may be saved each time a copy of the object 304 is made.

Figure 4:
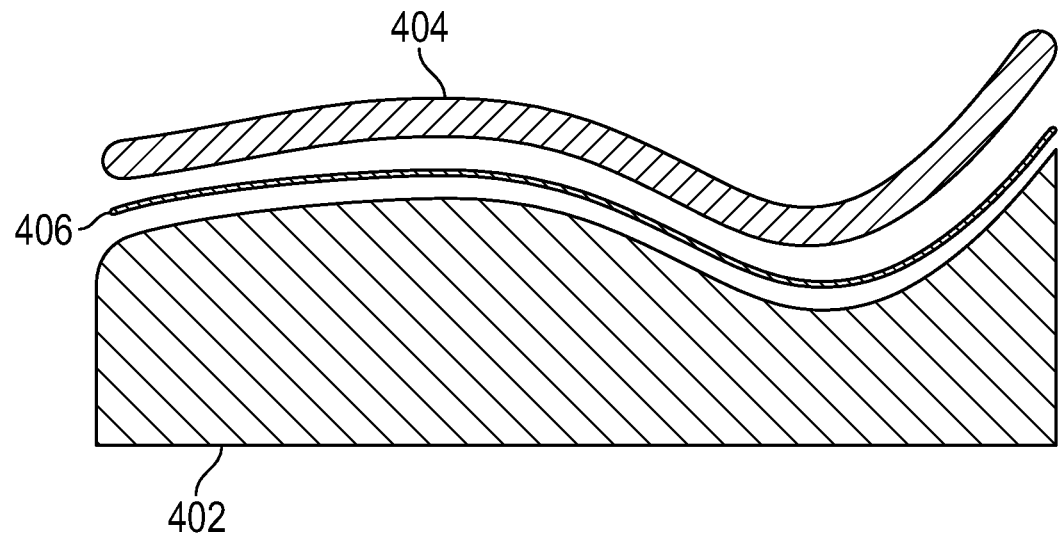
FIG. 4 shows an example in which a separating layer is used to more easily separate and object from a prefabricated support structure in accordance with one or more embodiments.

As discussed briefly above, the use of prefabricated supports may provide improved separation between the manufactured object and the support. FIG. 4 shows an example of how this improved separation may be achieved using the prefabricated supports. In this particular example, a separating layer or interface 406 is placed between a prefabricated support 402 and the object 404. More specifically, a separating layer 406 may be applied on top of the support prior to beginning the build process. The separating layer 406 may take various forms. In some embodiments, the separating layer 406 may be a masking material such as painters tape, for example. In other embodiments, a separating layer may be some form of a lubricant such as hairspray or some other coating which provides adequate stability for the object while still allowing for easy separation. In still other embodiments, a thin layer of intermediate material may be printed on top of the predefined support. For example, in a dual nozzle manufacturing device, one of the nozzles may extrude the intermediate material as a separating layer 406, and then the object 404 may be printed using the other nozzle. Of course, a skilled artisan will appreciate that embodiments may be practiced using a single nozzle device whereby materials are switched after printing the separating layer 406.

Figure 5A:
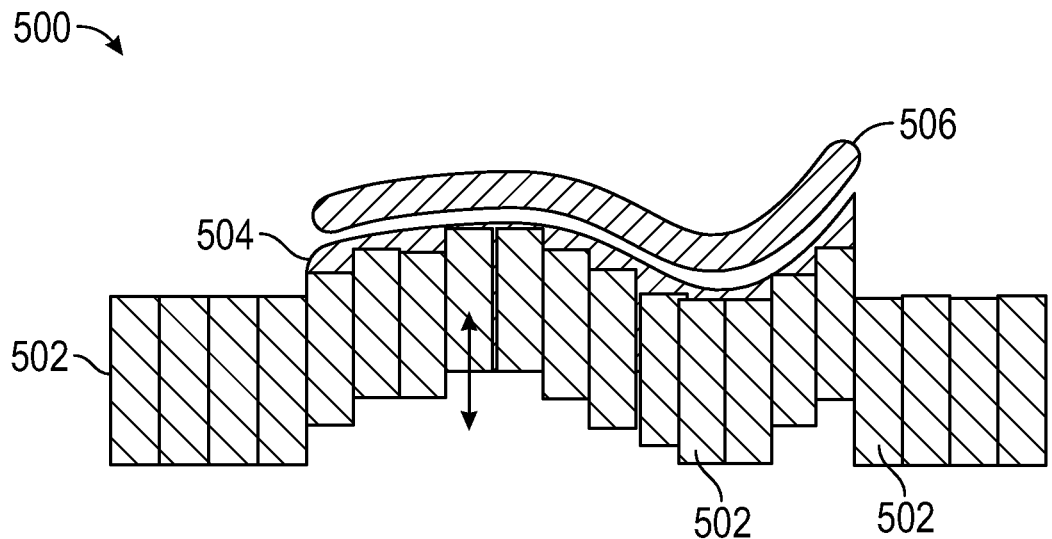
FIG. 5A is an example of a support structure made using dynamic beams according to certain embodiments.
Figure 5B:
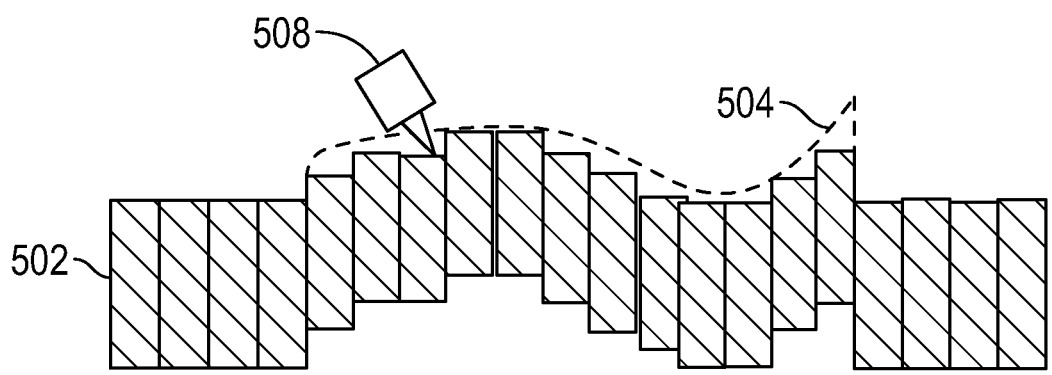
FIG. 5B illustrates an example of how the prefabricated support from FIG. 5A can be used as a base for additional supporting material built by the 3-D printer.

Although the prefabricated supports may be static in nature such as shown in FIG. 3, in some embodiments dynamic prefabricated supports may be utilized. FIGS. 5A and 5B provide an illustration of how dynamic prefabricated supports may be used (and re-used) to manufacture objects using an additive manufacturing device. Turning first to FIG. 5A, an implementation using dynamic beams 502 is shown. Here, a series of beams of varying height are combined on the platform in order to produce the desired shape of the support. As shown, the dynamic beams 502 may have varying heights which are positioned in order to follow the contour of the object to be printed. The beams 502 may have square edges. As a result, in order to have a free-form shape support, additional supporting material 504 may be printed on top of the dynamic beams 502 in order to conform to the actual shape of the object 506.

Turning to FIG. 5B, an illustration of how the additional supporting material 504 may be created is shown. Here, the extrusion nozzles 508 moves along the contour of the dynamic beams 502 and deposits layers of material which collectively form the additional supporting material 504 that may be used to support the object. Typically, this additional supporting material will be made from a different material than the dynamic beams 502. Utilizing a different material for the additional supporting material 504 allows for easier separation of the printed object from the dynamic beams 502. The additional supporting material 504 may also be formed of a different material than the object itself in order to provide easier separation from the manufactured object. However, in certain implementations such as single-nozzle 3-D printing devices, the additional supporting material 504 may be made from the same material as the printed object 506.

Turning back to FIG. 5A, the dynamic beams 502 may be a set of beams that is separate from the build platform and placed in the build platform to provide the support structure. If the dynamic beams 502 are separate from the build platform, the build platform in the additive manufacturing device may be configured to receive the adjustable beams and hold them in place during the build process. In some embodiments, 3-D modeling software may be configured to indicate which dynamic beams 502 should be positioned in which locations of the build platform. The build platform may be divided into a grid-like pattern such that the 3-D modeling software can output a vector location to indicate the specific location on the build platform that a dynamic beam 502 of a particular height should be placed. Alternatively, the beams may be part of the build platform itself, resulting in an adjustable build platform. In these embodiments, the build platform may be formed of a grid of beams attached to an actuation device that can raise or lower the beams according to commands from a control computer. Thus, when needed supports are generated by the 3-D modeling software, the dynamic build platform may be configured to maneuver its dynamic beams in such a way as to conform to the determined support structure.

Figure 6A:
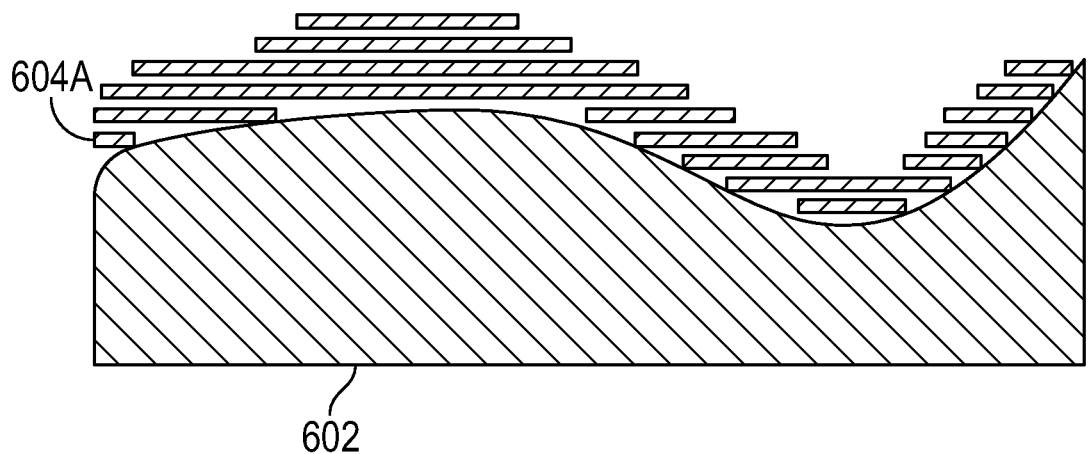
FIG. 6A is an illustration of a three-dimensional object built using flat layers on a prefabricated support.
Figure 6B:
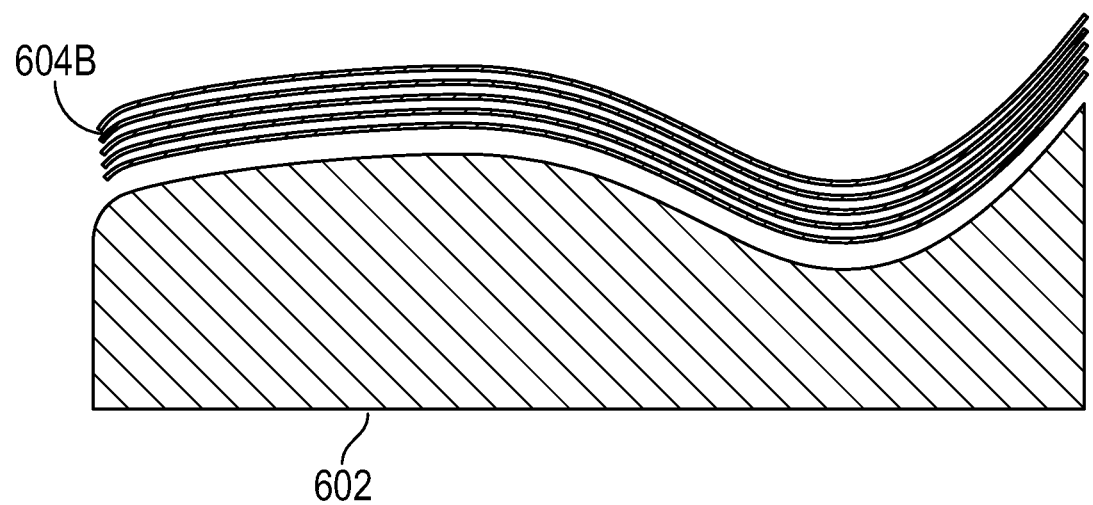
FIG. 6B is an illustration of a three-dimensional object built using curved layers on a prefabricated support.

The use of prefabricated support structures may also provide benefits with respect to building strategy. In particular, when utilizing prefabricated support structures, the build process may use traditional "flat" layering (such as fused deposition modeling), but it also may allow for the use of curved or conformal layering which may provide for improved structural integrity throughout the object. In some embodiments, a blend of flat layering and curved layering may be utilized. Accordingly, in certain embodiments, systems and methods which use conformal layers as described herein may make use of prefabricated support structures. For example, curved layers of such objects that use conformal layers may be built upon prefabricated support structures having a corresponding curved surface. Turning now to FIG. 6A, an example of traditional flat layering on top of the prefabricated support is shown. In this example, a static prefabricated support 602 is placed in the build area of an additive manufacturing device. The additive manufacturing device deposits a series of flat layers 604A on top of the prefabricated support 602. Utilizing a "flat" build strategy, nine different layers are needed to build the object 604A. Utilizing curved layering, as shown in FIG. 6B, a reduced number of layers are needed, resulting in an improved structural integrity and shorter printing time. As shown in FIG. 6B, the same object is printed using only five curved layers 604B. Thus utilizing the prefabricated support 602, an object may be first produced using flat layers, and then later produced using curved layers, without needing to change or generate a new support structure.

Figure 7:
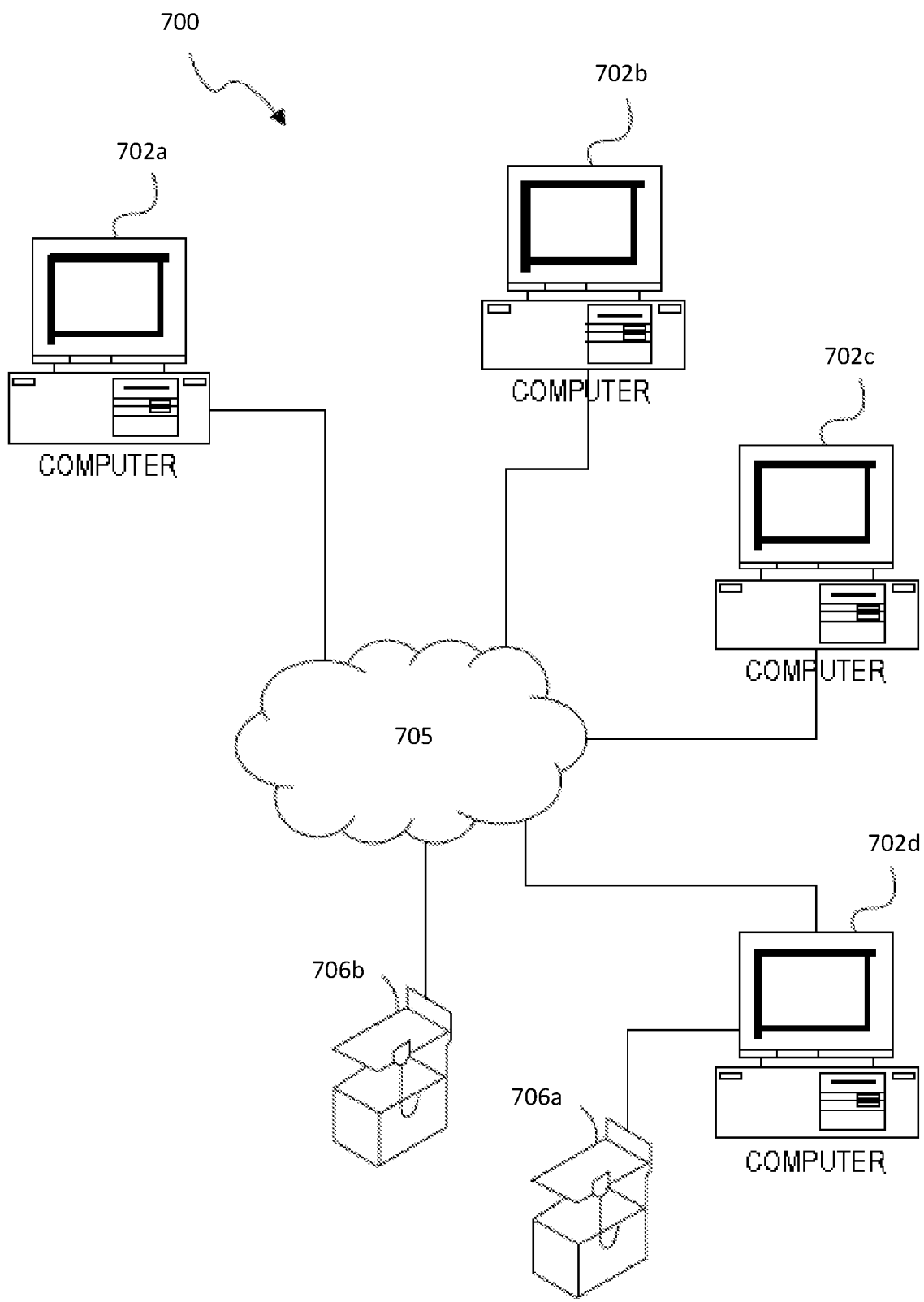
FIG. 7 is an example of a 3-D printing environment suitable for implementing the systems and methods disclosed herein.

Various embodiments may be practiced within a system for designing and manufacturing 3D objects. Turning to FIG. 7, an example of a computer environment suitable for the implementation of 3D object design and manufacturing is shown. The environment includes a system 700. The system 700 includes one or more computers 702a-702d, which can be, for example, any workstation, server, or other computing device capable of processing information. In some aspects, each of the computers 702a-702d can be connected, by any suitable communications technology (e.g., an internet protocol), to a network 705 (e.g., the Internet). Accordingly, the computers 702a-702d may transmit and receive information (e.g., software, digital representations of 3-D objects, commands or instructions to operate an additive manufacturing device, etc.) between each other via the network 705.

The system 700 further includes one or more additive manufacturing devices (e.g., 3-D printers) 706a-706b. As shown the additive manufacturing device 706a is directly connected to a computer 702d (and through computer 702d connected to computers 702a-702c via the network 705) and additive manufacturing device 706b is connected to the computers 702a-702d via the network 705. Accordingly, one of skill in the art will understand that an additive manufacturing device 706 may be directly connected to a computer 702, connected to a computer 702 via a network 705, and/or connected to a computer 702 via another computer 702 and the network 705.

It should be noted that though the system 700 is described with respect to a network and one or more computers, the techniques described herein also apply to a single computer 702, which may be directly connected to an additive manufacturing device 706.

Figure 8:
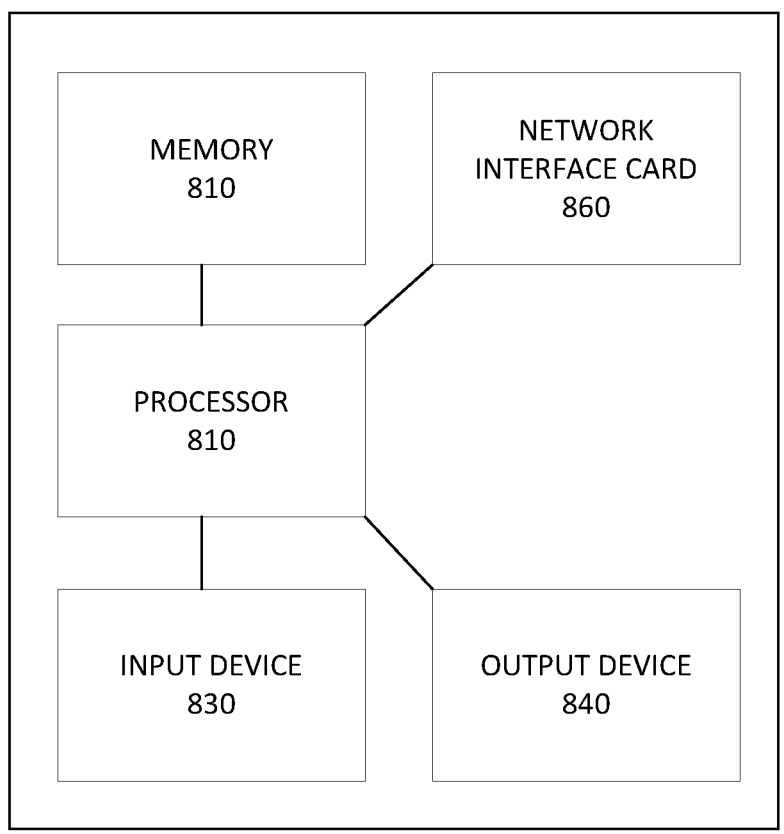
FIG. 8 example of a computer system shown in FIG. 7.

FIG. 8 illustrates a functional block diagram of one example of a computer of FIG. 7. The computer 702a includes a processor 810 in data communication with a memory 820, an input device 830, and an output device 840. In some embodiments, the processor is further in data communication with an optional network interface card 860. Although described separately, it is to be appreciated that functional blocks described with respect to the computer 802a need not be separate structural elements. For example, the processor 810 and memory 820 may be embodied in a single chip.

The processor 810 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 810 can be coupled, via one or more buses, to read information from or write information to memory 820. The processor may additionally, or in the alternative, contain memory, such as processor registers. The memory 820 can include processor cache, including a multi-level hierarchical cache in which different levels have different capacities and access speeds. The memory 820 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 810 also may be coupled to an input device 830 and an output device 840 for, respectively, receiving input from and providing output to a user of the computer 702a. Suitable input devices include, but are not limited to, a keyboard, buttons, keys, switches, a pointing device, a mouse, a joystick, a remote control, an infrared detector, a bar code reader, a scanner, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, additive manufacturing devices, and haptic output devices.

The processor 810 further may be coupled to a network interface card 860. The network interface card 860 prepares data generated by the processor 810 for transmission via a network according to one or more data transmission protocols. The network interface card 860 also decodes data received via a network according to one or more data transmission protocols. The network interface card 860 can include a transmitter, receiver, or both. In other embodiments, the transmitter and receiver can be two separate components. The network interface card 860, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

Figure 9:
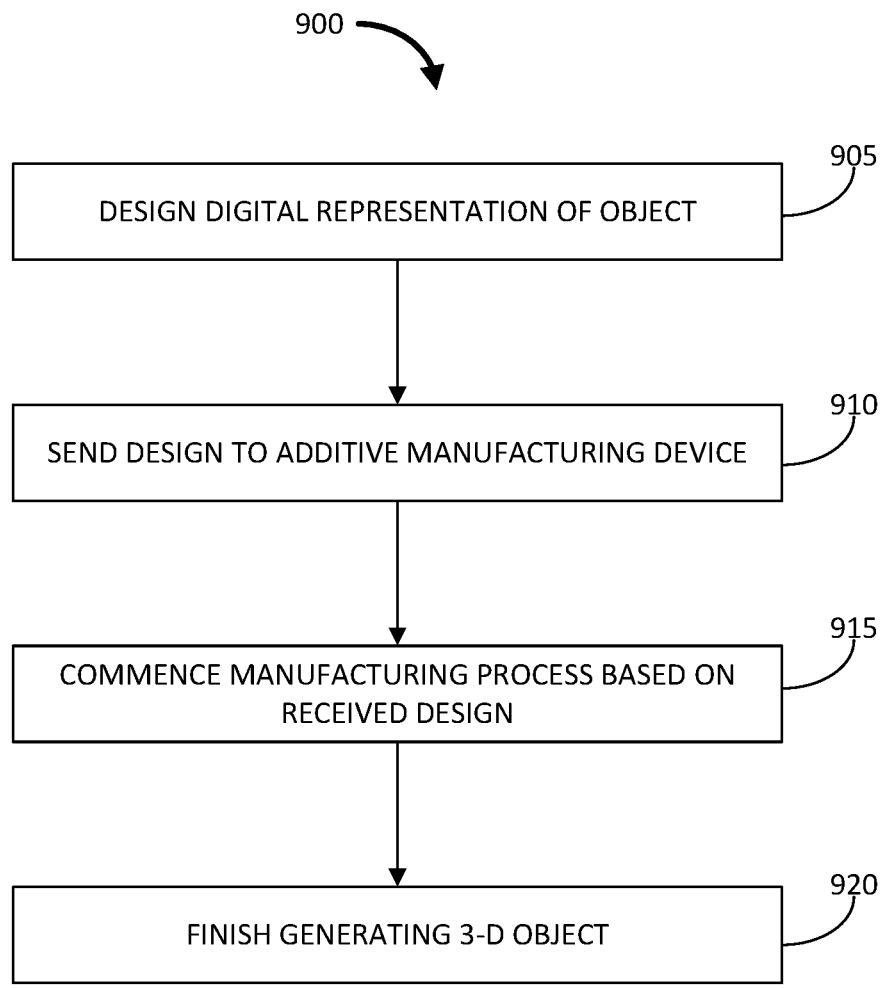
FIG. 9 is a high level illustration of an additive manufacturing process which an object is printed using a 3-D printer such as that shown in FIG. 8.

FIG. 9 illustrates a process 900 for manufacturing a 3-D object or device. As shown, at step 905, a digital representation of the object is designed using a computer, such as the computer 702a. For example, 2-D or 3-D data may be input to the computer 702a for aiding in designing the digital representation of the 3-D object. Continuing at step 910, information is sent from the computer 702a to an additive manufacturing device, such as additive manufacturing device 706, and the device 706 commences the manufacturing process in accordance with the received information. At step 915, the additive manufacturing device 706 continues manufacturing the 3-D object using suitable materials, such as a liquid resin (for stereolithography applications, for example), powder (for sintering applications), thermoplastic (for fused deposition modelling), or some other suitable 3-D printing material. Further, at step 920, the 3-D object is generated.

These suitable materials may include, but are not limited to a photopolymer resin, polyurethane, methyl methacrylate-acrylonitrile-butadiene-styrene copolymer, resorbable materials such as polymer-ceramic composites, metal, metal alloy, etc. Examples of commercially available materials are: DSM Somos® series of materials 7100, 8100, 9100, 9420, 10100, 11100, 12110, 14120 and 15100 from DSM Somos; ABSplus-P430, ABSi, ABS-ESD7, ABS-M30, ABS-M30i, PC-ABS, PC ISO, PC, ULTEM 9085, PPSF and PPSU materials from Stratasys; Accura Plastic, DuraForm, CastForm, Laserform and VisiJet line of materials from 3D-Systems; the PA line of materials, PrimeCast and PrimePart materials and Alumide and CarbonMide from EOS GmbH, Aluminum, CobaltChrome and Stainless Steel materials, MarangingSteel, Nickel Alloy, and Titanium. The VisiJet line of materials from 3-Systems may include Visijet Flex, Visijet Tough, Visijet Clear, Visijet HiTemp, Visijet e-stone, Visijet Black, Visijet Jewel, Visijet FTI, etc. Examples of other materials may include Objet materials, such as Objet Fullcure, Objet Veroclear, Objet Digital Materials, Objet Duruswhite, Objet Tangoblack, Objet Tangoplus, Objet Tangoblackplus, etc. Another example of materials may include materials from the Renshape 5000 and 7800 series.

Figure 10A:
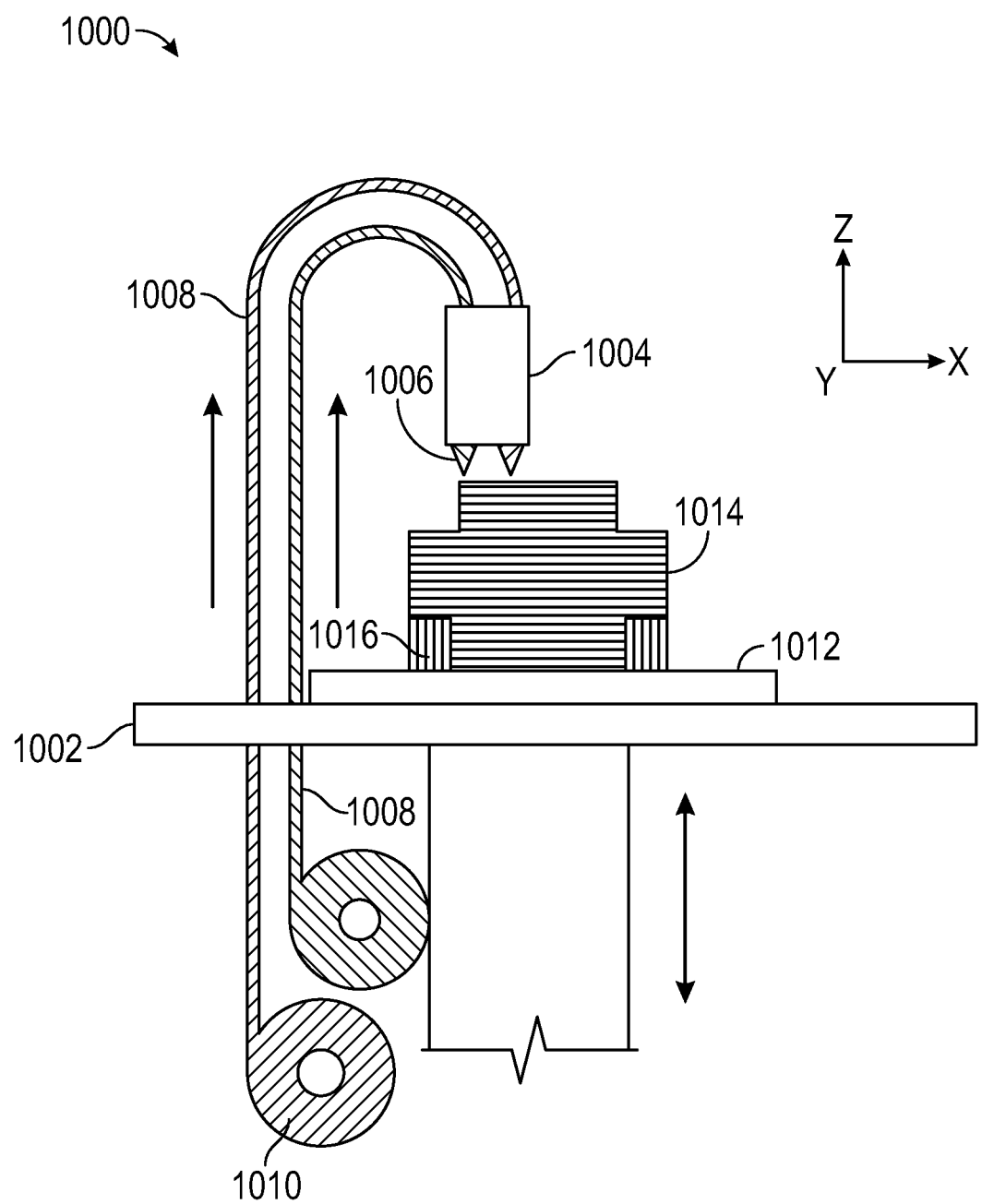
FIGS. 10A-10C are examples of additive manufacturing devices which may be used to generate 3-D printed objects in accordance with one or more embodiments disclosed herein.

The embodiments described herein may be implemented using a fused deposition modelling ("FDM") device. FIG. 10A is block diagram providing an example of an FDM device 1000 which may be used in connection with one or more embodiments. As shown, the FDM device 1000 includes a build platform 1002 which may be moveable along a Z-axis, driven by a Z-axis motor (not shown). The FDM device 1000 may also include a liquefier head 1004 which has one or more extrusion nozzles 1006. In this example, the liquefier head 1004 includes two extrusion nozzles 1006. The extrusion nozzles 1006 may be configured to extrude different materials—for example, a build material and a support material. The different extrusion nozzles may also be configured to extrude two different build materials. Some FDM devices 1000 may include more than two extrusion nozzles 1006. The liquefier head 1004 receives build and/or support material 1008 from one or more spools 1010. As stated above, the material may be a thermoplastic material. The material is spooled into the liquefier head 1004, where it is heated into a liquid or partially-liquid form and extruded through the extrusion nozzles 1006.

The extrusion nozzles may be driven by one or more motors (not shown) along the X-axis and Y-axis. Thus, the extrusion nozzles 1006 can be moved to the appropriate location over the build platform to deposit the build and/or support material 1008 in the appropriate location according to design of the part to be printed. In some implementations, the liquefier head (or liquefier heads) may be configured to also move along the Z-axis. In these implementations, build platform may remain stationary during the build process. The FDM device 1000 may also include a foam slab 1012 or some other base material that is placed on top of the build platform prior to beginning a build process. The foam slab is typically used to hold the object firmly in place while it is being printed. As shown in the example of FIG. 10A, an FDM device may print a part 1014 that includes support 1016. The part 1014 may be printed from one nozzle 1006 using the build material spool, while the supports 1016 may be printed from the other nozzle 1006 using the support material spool. In addition, the FDM device 1000 may also include multiple nozzles with build material, with each nozzle having a different build material with different material properties. Alternatively, the FDM device may be a single nozzle device in which the support is printed using a first material, and the build material is then changed out to print the object on top of the support.

Figure 10B:
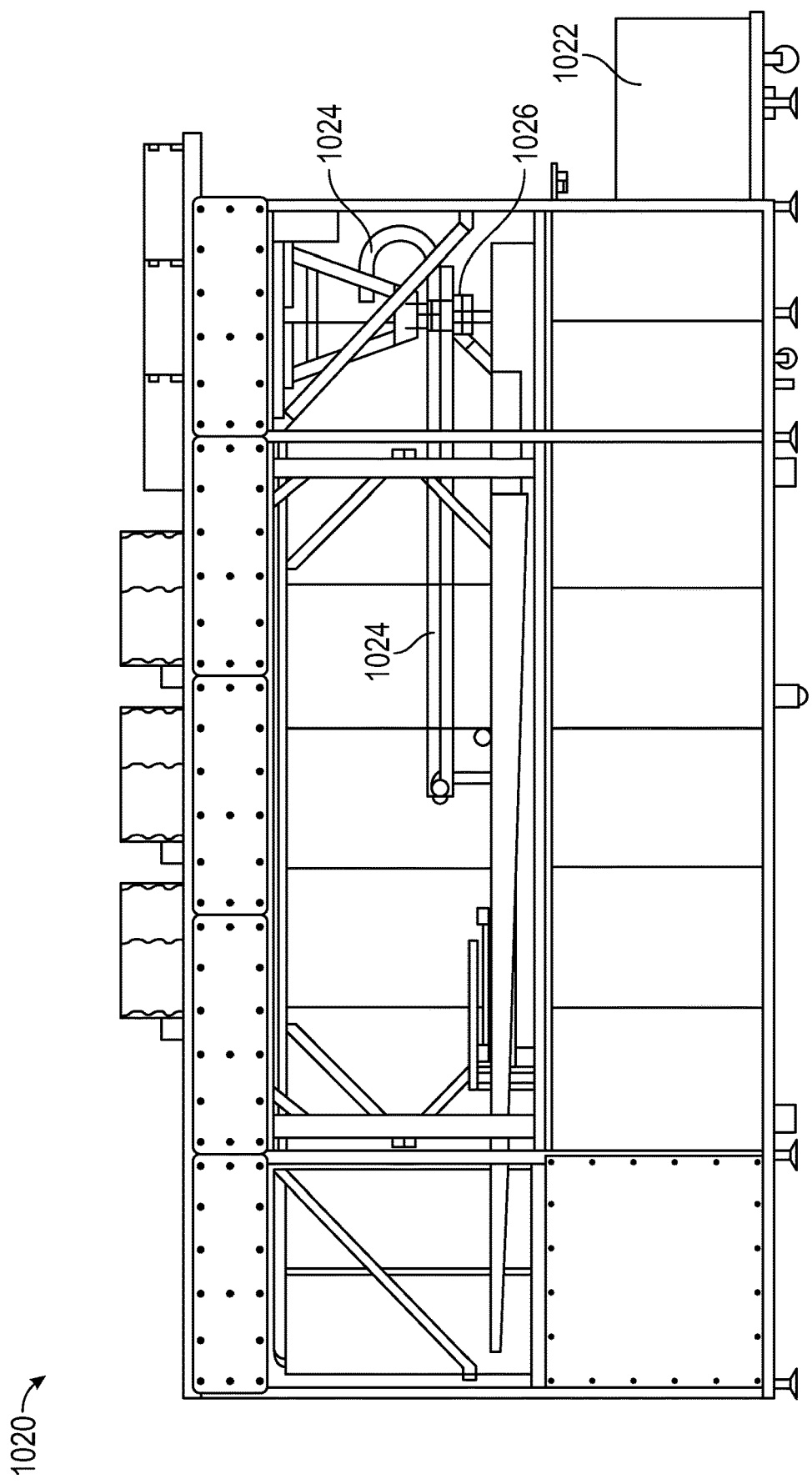

Although the embodiments described herein are generally described in the context of fused deposition modelling printing, a skilled artisan will appreciate that other types of 3-D printing devices may be used to implement the inventions described herein. For example, various embodiments may be practiced using a stereolithography apparatus. FIG. 10B illustrates an exemplary stereolithography manufacturing apparatus 1020 for generating a three-dimensional (3-D) object. The stereolithography apparatus 1020 includes a reservoir 1022 that may hold a volume of liquid, such as a resin used to build the 3-D object. The stereolithography apparatus 1020 further includes a transport system 1024 that may be used to transport the liquid from the reservoir 1022 to an object coater head 1026. The transport system may include one or more tubes, pipes, or hoses configured to transport the liquid from the reservoir 1022. In some embodiments, the transport system 404 may include metal or plastic materials, such as ultra-high molecular weight polyethylene (UHMWPE), polyacrylate (PA), polyvinyl chloride (PVC), or any other suitable material. Although this particular example provides a stereolithography apparatus with a transport system, a skilled artisan will appreciate that other types of stereolithography apparatuses may not use a transport system to transport resin to a build platform. Rather, the build platform may instead be configured to sink into the reservoir during the building process.

The stereolithography apparatus 1020 may further include a guiding structure in the reservoir 1022 configured to guide a flow of the liquid from the reservoir 1022 to the transport system 1024. For example, the structure may include a series of tubes or plates that are placed to strategically direct the flow of the liquid to the transport system 1024. The apparatus 1020 also may include a building area where the liquid resin is deposited. The building area typically includes a building area support upon which the 3D object is built.

The stereolithography apparatus 1020 further includes a light source. The light source is typically included for the purpose of polymerizing the liquid to form a 3D object. The light source may take various forms. In some embodiments, the light source may be an electromagnetic light source, such as an ultra-violet (UV) light source, an infrared (IR) light source. In general, the light source may be any type of laser beam capable of solidifying the liquid.

In some implementations, the stereolithography apparatus 1020 may include at least one pump used to pump the liquid from the reservoir 1022 to the object coater head 1026. For example, a positive displacement pump and/or a centrifugal-type pump may be used. In some embodiments, the pump may include a filter unit to add further filtration to the liquid resin prior to being deposited to the building area. In some aspects, the pump may provide a defined flow (e.g., 0.5-40 liters/min) that may be fixed or regulated via an active feedback loop. For example, the feedback loop may be direct based upon flow measurements. As another example, the feedback may be indirect using measurements of the thickness of the layers being deposited in the additive manufacturing process.

The stereolithography apparatus 1020 may be used to generate one or more 3D objects layer by layer. The stereolithography machine 1020, for example, may utilize a liquid resin (e.g., a photopolymer resin) to build an object a layer at a time, such as by depositing the resin from the object coater head 1026 in the form of a curtain. In these implementations, the object coater head 1026 may deposit successive layers of the liquid resin to form the object. Initially, the object coater head 1026 may deposit a layer of the 3D object on the building area support. Subsequent layers may be then deposited on the preceding layer of the 3D object.

With the depositing of each layer, the light source, which as discussed above may be controlled by a computer, may trace a specific pattern on the surface of the liquid resin to form the dimensions of the 3D object. Exposure to the light source polymerizes, cures, or solidifies the pattern traced on the resin and adheres it to the layer below. After a coat has been polymerized, the building area support may descend by a single layer thickness and a subsequent layer pattern is traced and is adhered to the previous layer. The building process is complete when the 3-D object is formed by depositing all layers of the 3D object.

Figure 10C:
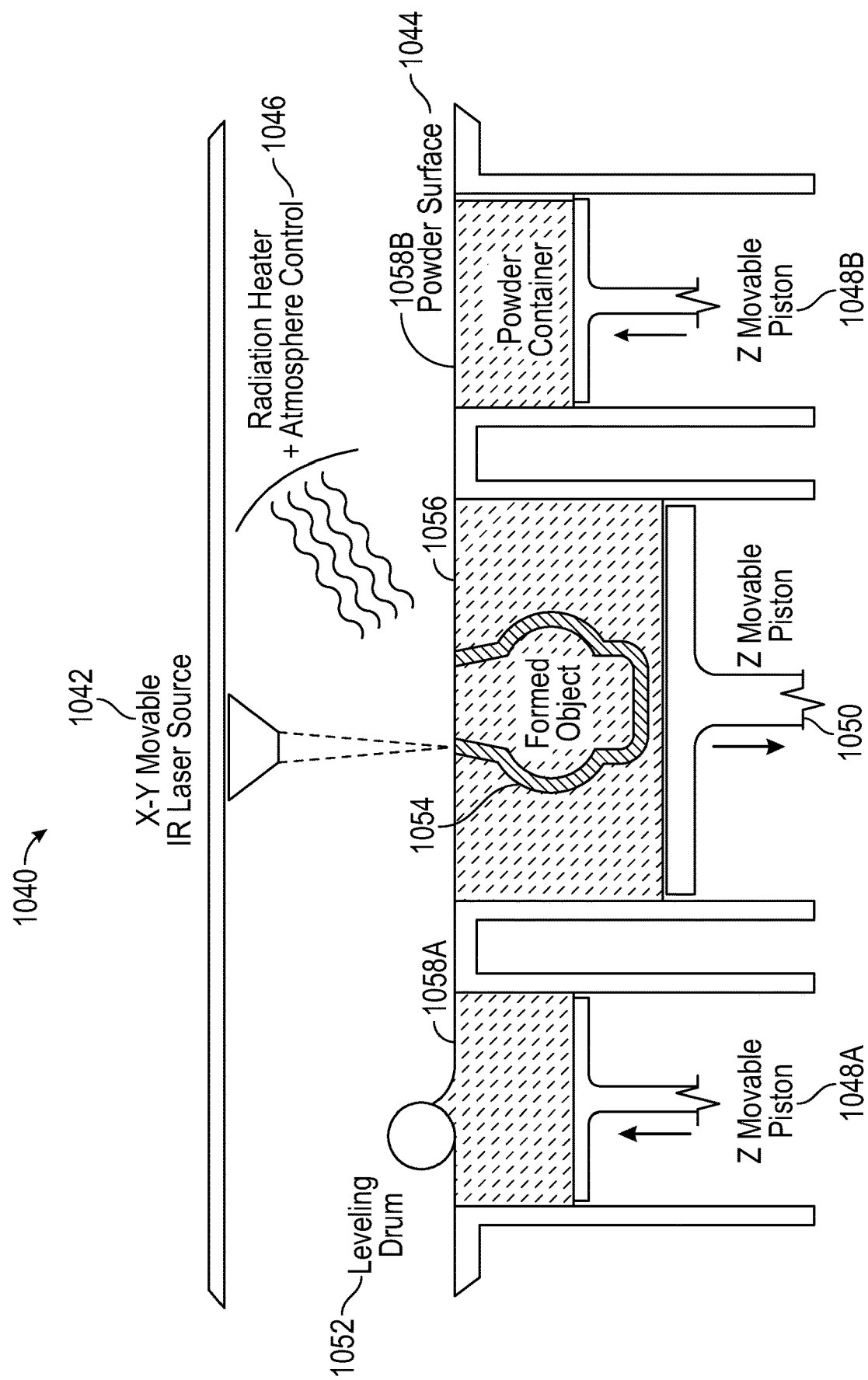

Turning now to FIG. 10C, another example of an additive manufacturing apparatus is provided. In this example, the additive manufacturing apparatus is a laser sintering device 1040. Like the FDM device 1000 and the stereolithography device 1020, the laser sintering device 1040 allows 3D objects to be built layer by layer. The layers are formed of powder, such as the powder surface 1044 shown in FIG. 10C. Successive powder layers are spread on top of each other using, for example, a leveling drum 1052. After deposition, a computer-controlled CO2 laser beam scans the surface and selectively binds together the powder particles of the corresponding cross section of the product. In this example, the laser source 1042 is an X-Y moveable infrared laser source. As such, the laser source can be moved along an X axis and along a Y axis in order to direct its beam to a specific location of the top most layer of powder. In some embodiments, the laser sintering device may further include a laser scanner (not shown in FIG. 10C) which receives a laser beam from a stationary laser source, and deflects it over moveable mirrors to direct the beam to a specified location in the working area of the device. During laser exposure, the powder temperature rises above the glass transition point after which adjacent particles flow together to create the 3D object. The device 1040 may also include a radiation heater and atmosphere control device 1046. The radiation heater may be used to preheat the power between the recoding of a new power later powder layer in the scanning of that layer. The atmosphere control device may be used throughout the process to avoid undesired scenarios such as, for example, powder oxidation.

In some embodiments, the powder may be distributed using one or more moveable pistons 1048A and 1048B which push powder from a powder container 1058A and 1058B into a reservoir 1056 which holds the formed object 1054. The depth of the reservoir, in turn, is also controlled by a moveable piston 1050, which increases the depth of the reservoir 1056 via downward movement as additional powder is moved from the powder containers 1058A and 1058B in to the reservoir 1056.

A skilled artisan will recognize that, in addition to the additive manufacturing technologies described in FIGS. 10A-10C above, other deposition and nozzle-based additive manufacturing technologies may be utilized in connection with the supports and substrates disclosed herein. For example, the supports and substrates described herein may be used in connection with a laser cladding or laser deposition device in which a stream of a powder is fed into a focused laser beam as it is scanned across the target surface, leaving behind a deposited coating of the material. Embodiments may also be implemented in direct ink writing build processes which involve objects with large overhangs and spanning regions. For example, in certain aspects, embodiments may be implemented where at least a material deposition component (e.g., one or more extrusion nozzles, extrusion heads, jetting nozzles, jetting heads, etc.) of an additive manufacturing equipment may be mounted on or coupled to a movable device (e.g., robotic arm, robot, etc.) that allows the material deposition component to move in 3D space (e.g., along X, Y, and Z axes). The material deposition component may include one or more components configured to deposit one or more materials for additive manufacturing. In certain aspects, embodiments may be implemented using a 5-axis milling machine or a hexapod device.

Figure 11:
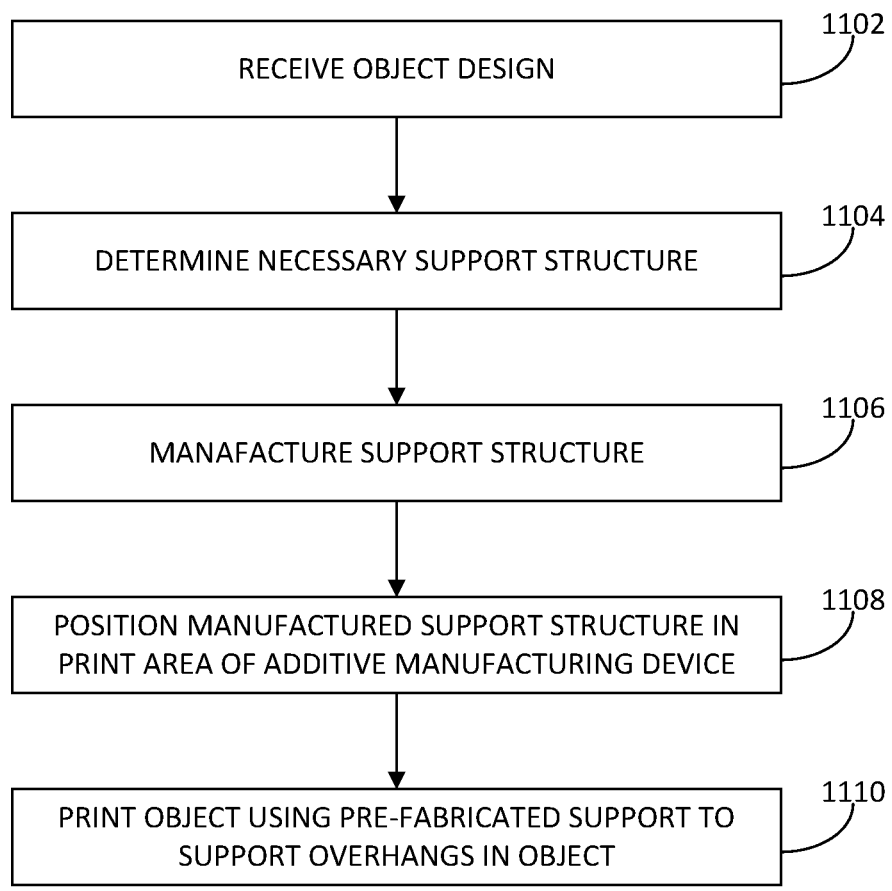
FIG. 11 is a flow chart illustrating one process by which an object can be manufactured using prefabricated supports.

Using the prefabricated support structures discussed above in connection with the additive manufacturing devices described above, various methods for producing objects using additive manufacturing devices may be realized. FIG. 11 is a flow chart illustrating one process by which an object can be manufactured using prefabricated supports. The process begins at block 1102, where an object design is received. The object design may be a 3D printing file such as an STL file or some other suitable file format. Next, the process moves to block 1104, where in the design file is processed by 3D modelling software to determine the support structure needed in order to successful print the object using an additive manufacturing device. Other, less efficient support generation techniques may be used as well because the prefabricated supports will be generally re-usable.

The process then moves to block 1106, where the support structure is manufactured. As discussed above, the support structure may be a manufactured using a variety of manufacturing techniques, including 3D printing, casting, molding, milling, and the like. Once the support has been manufactured, the process moves to block 1108. There, the manufactured support structure is moved into position on the build platform of the additive manufacturing device. Once the prefabricated support is positioned in the print area, the process moves to block 1110, where the object is printed using the prefabricated support to support overhangs in the object design.

Figure 12:
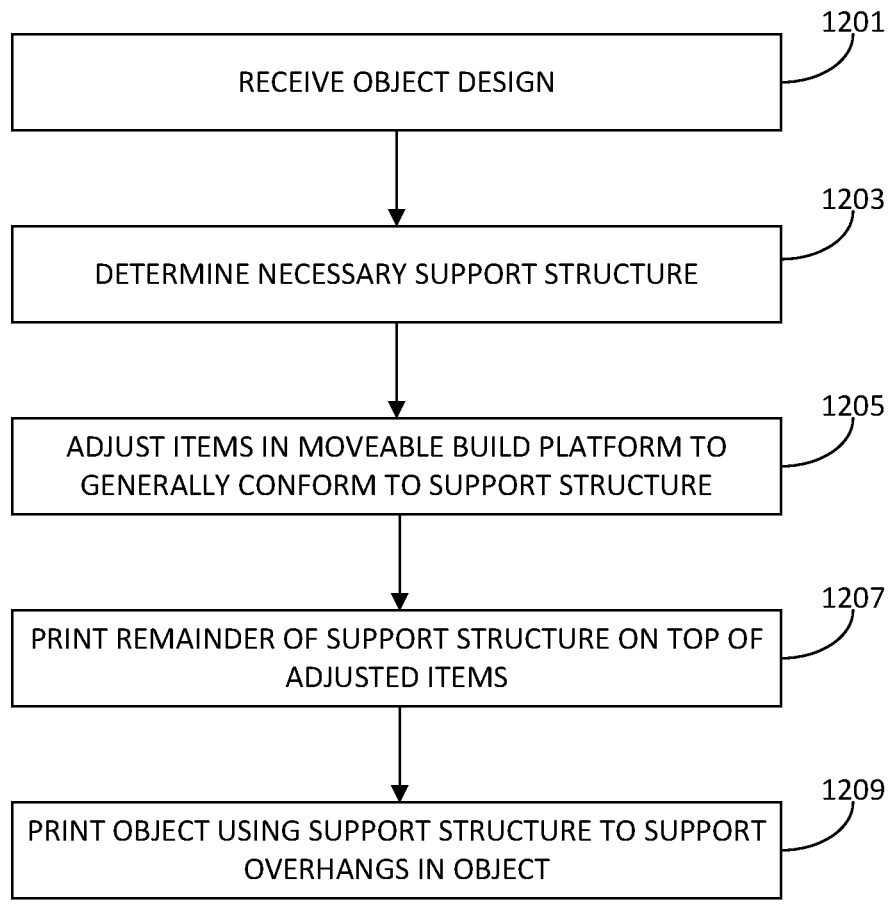
FIG. 12 is a flow chart illustrating one process by which an object can be manufactured using prefabricated supports provided by an adjustable build platform.

In the example provided in connection with FIG. 11, in certain aspects, the support structure may be formed as a separate object which is placed into the build area of the printer. In certain aspects, the object printed using the prefabricated support may be separated from or integrated with the prefabricated support as discussed. In certain embodiments, the build platform may be comprised of moveable structures which can be used to support an object being manufactured on the platform. FIG. 12 is a flow chart illustrating one process by which an object can be manufactured using prefabricated supports provided by an adjustable build platform. The process begins at block 1201, where the object design for the object to be manufactured is received into the additive manufacturing system. Next, the process moves to block 1203, where the needed support structures are determined. Once the support structures have been determined, the adjustable build platform is adjusted to generally conform to the determined support structure at block 1205. As discussed previously, the build platform may be formed of a grid of beams attached to an actuation device that can raise or lower the beams according to commands from a control computer. Thus, based on the needed support structure, various beams in the build platform may be raised to conform to the design. Once the items in the adjustable build platform have been positioned, the process may then move to block 1207. There, the rest of the support structure may be printed on top of the adjusted build platform. In some embodiments, the remainder of the support structure that is 3D printed is made from a different material as the object to be printed. In other embodiments, the same material may be used. Once the remainder of the support structure has been layered over the adjusted build platform, the process moves to block 1209. There, the object is printed over the support structure.

Figure 13:
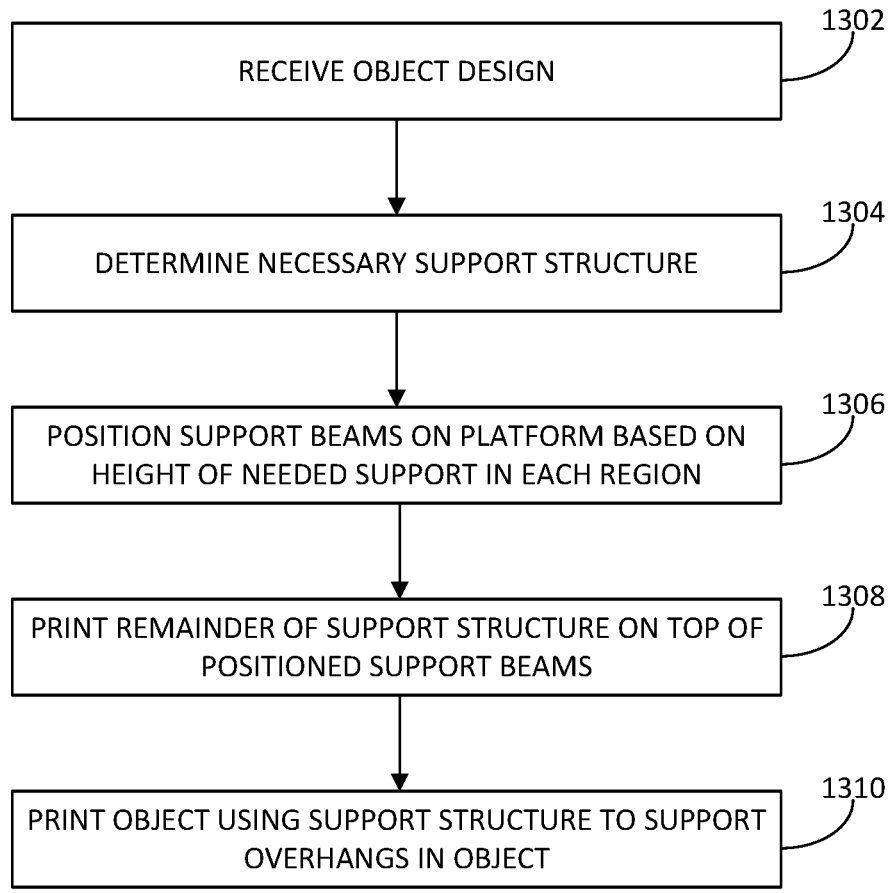
FIG. 13 is a flow chart illustrating a process by which dynamic support beams may be used to form the basis of object supports in a printed object according to certain embodiments.

In some embodiments, dynamic beams may be placed in a conventional build area to form the basic shape of the support structures. FIG. 13 is a flow chart illustrating a process by which dynamic support beams may be used in printing an object. The process begins at block 1302 where the object design is received by the additive manufacturing system. The process then moves to block 1304, where the system determines the necessary support structure. Next, the process moves to block 1306. There, the dynamic support beams are selected and positioned on the build platform based on the height of the support needed in each region of the platform. Once the dynamic beams have been positioned on the build platform, the process moves to block 1308, where the remainder of the support structure is printed over the positioned dynamic support beams. Once the remainder of the support structure is completed, the process moves to block 1310, where the object is printed using the support structure to support overhangs in the object design.

As noted above, existing techniques for manufacturing insoles result in objects that commonly suffer from inter-layer weakness. FIG. 14A illustrates an example of an item manufactured using traditional layering, and susceptible to inter-layer weakness. As shown, FIG. 14A shows an object 1400 which is manufacturing using traditional FDM layering methods. The object includes a bottom surface 1402 and a top surface 1404. In this example, the object 1400 has been manufactured using traditional FDM. As a result, the object includes seven layers 1406 between the top surface 1404 and the bottom surface 1402 which are printed in the standard XY plane. As a result, the layers are each printed in a straight line that is not congruent with the bottom surface 1402 and top surface 1404 of the object 1400.

In certain inventive embodiments disclosed herein, one or more layers are curved such that they conform to, and are generally parallel to, the curving outer surface of the object. Additionally, one or more layers may be curved such that they conform to stress patterns identified in connection with use of the object. In certain embodiments, such curved layers may be formed on pre-fabricated supports as described herein having curved surfaces that conform to the curved layers. FIG. 14B provides an illustration of an item manufactured using curved layers. As shown, object 1420 is similar in shape to object 1400 from FIG. 14A. The object 1420 includes a bottom surface 1422 and a top surface 1424. Unlike the layers shown in FIG. 14A, the layers 1426 shown in the object 1420 of FIG. 14B are curved and follow the contour of the outer surfaces 1422 and 1424 of the object 1420. These layers are formed using a curved layer printing process, such as, for example, a curved-layer fused deposition modeling ("CLFDM") process in which the printing of layers includes not only the traditional XY plane, but also includes a Z coordinate which allow for the curvature shown in FIG. 14B. In some embodiments, object 1420 may be manufactured using a pre-fabricated support structure as described herein with a complementary surface to at least one of the outer surfaces 1422 and 1424 to form the curved layers. As will be explained in detail below, using the CLFDM techniques in the design and production of insoles solves many of the problems encountered in existing footwear manufacturing techniques. Moreover, although the examples provided below are in the context of CLFDM printing, a skilled artisan will appreciate that other types of curved layer printing may be used in accordance with the inventive embodiments described herein. Further, although examples are described with respect to footwear, the systems and methods described herein may similarly be used to solve issues with other object manufacturing techniques.

Figure 15A:
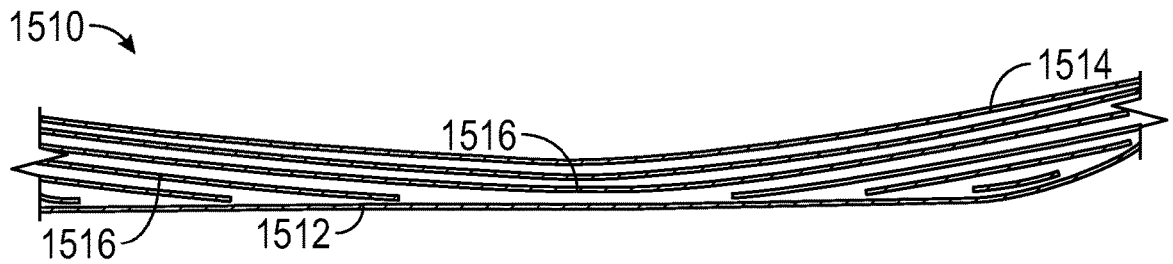
FIG. 15A is an illustration of an item having curved layers in which the infill layers are based on the shape of a top layer.
Figure 15B:
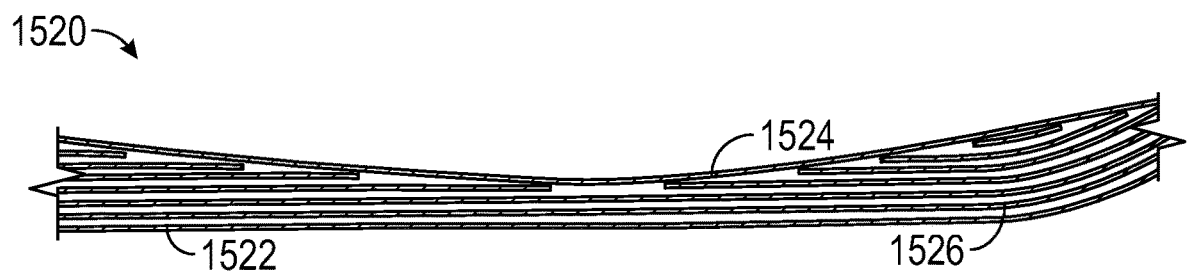
FIG. 15B is an illustration of an item having curved layers in which the infill layers are based on the shape of a bottom layer.
Figure 15C:
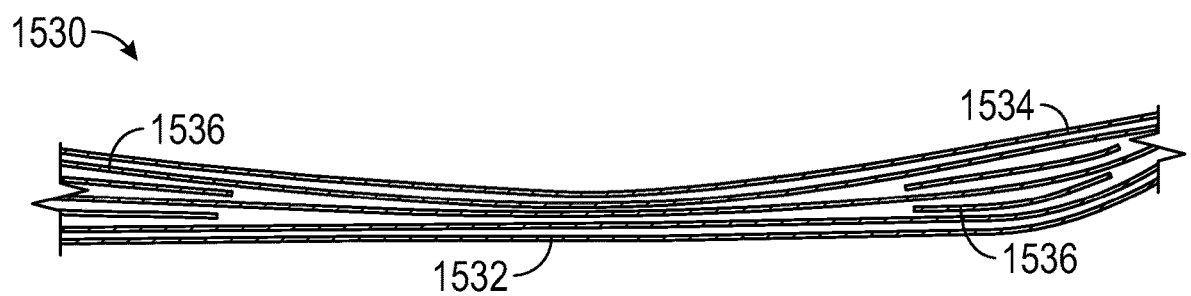
FIG. 15C is an illustration of an item having curved layers in which the infill layers are based on the shape of a top layer and a bottom layer.

FIGS. 15A-15C provide illustrations of various infill methods that may be used to produce insoles in accordance with one or more embodiments of the invention. In certain embodiments, one or more of the insoles described with respect to FIGS. 15A-15C may be formed on a pre-fabricated support structure, such as a prefabricated support structure having a curved surface conforming to at least one of a top surface and a bottom surface of the insole. FIG. 15A is an illustration of an insole having curved layers in which the infill (also referred to as "inner") layers are based on the shape of a top layer. As shown, an insole 1510 includes a bottom surface 1512 which is largely straight across, but curves upward at its rightmost edge. The insole 1510 also includes a top surface 1514 which is curved throughout, with raised sides descending into the center portion of the insole. Thus, the insole 1510 does not have a constant thickness throughout, and the number of layers between the bottom surface 1512 and the top surface 1514 varies along the insole. In the example shown in FIG. 15A, the layers 1516 are generally made to conform to the curvature of the top surface 1514. Thus, the two highest infill layers extend across the entire insole, but the remaining layers are divided because their curvature causes them to meet the relatively flat bottom surface 1512.

FIG. 15B is an illustration of an insole 1520 having curved layers in which the infill layers are based on the shape of the bottom surface of the insole. In this example, the insole 1520 includes a bottom surface 1522 and a top surface 1524. The bottom surface 1522 and the top surface 1524 are generally of the same shape as the bottom surface 1512 and the top surface 1514 shown in FIG. 15A. unlike FIG. 15A, the infill layers 1526 shown in FIG. 15B follow the contour of the bottom surface 1526. As a result, the infill layers near the bottom surface 1526 extend across the entire insole, while those infill layers 1526 closer to the top surface 1524 are separated by the curvature of the top layer 1524.

In addition to defining layers which follow the contour of the top surface (as shown in FIG. 15A) and the bottom surface (as shown in FIG. 15B), the infill layers may also be printed to be based on both the top surface and the bottom surface of the insole. In particular, FIG. 15C is an illustration of an item having curved layers in which the infill layers are based on both the shape of the top layer and the bottom layer. As shown in FIG. 15C, an insole 1530 includes a bottom surface 1532 and a top surface 1534. The insole 1530 includes infill layers 1536. In this example, the infill layer 1536 of the insole 1530 which is closest to the top surface 1534 closely follows the contour and shape of the top surface 1534. Similarly, the layer 1536 closest to the bottom surface 1532 closely follows the contour and shape of the bottom surface 1532. The intermediate layers have varying shapes. In this example, the middle layer is shaped to conform to the average curvature of both the top surface 1534 and the bottom surface 1532. Because the insole is thinnest in its center portion, the remaining layers do not extend across the entire insole, and instead are separated because there is insufficient space for them across the center portion of the insole 1530.

By using the curved layer techniques shown in FIGS. 15A-15C, smoother surface finishing can be achieved in the insole, as the outer surface of the insole is printed in a single layer. In addition to providing significant aesthetic advantages, and reducing the need for postproduction processing, the smoother outer surface also may provide for reduced friction between the insole and the foot of the wearer.

Figure 16:
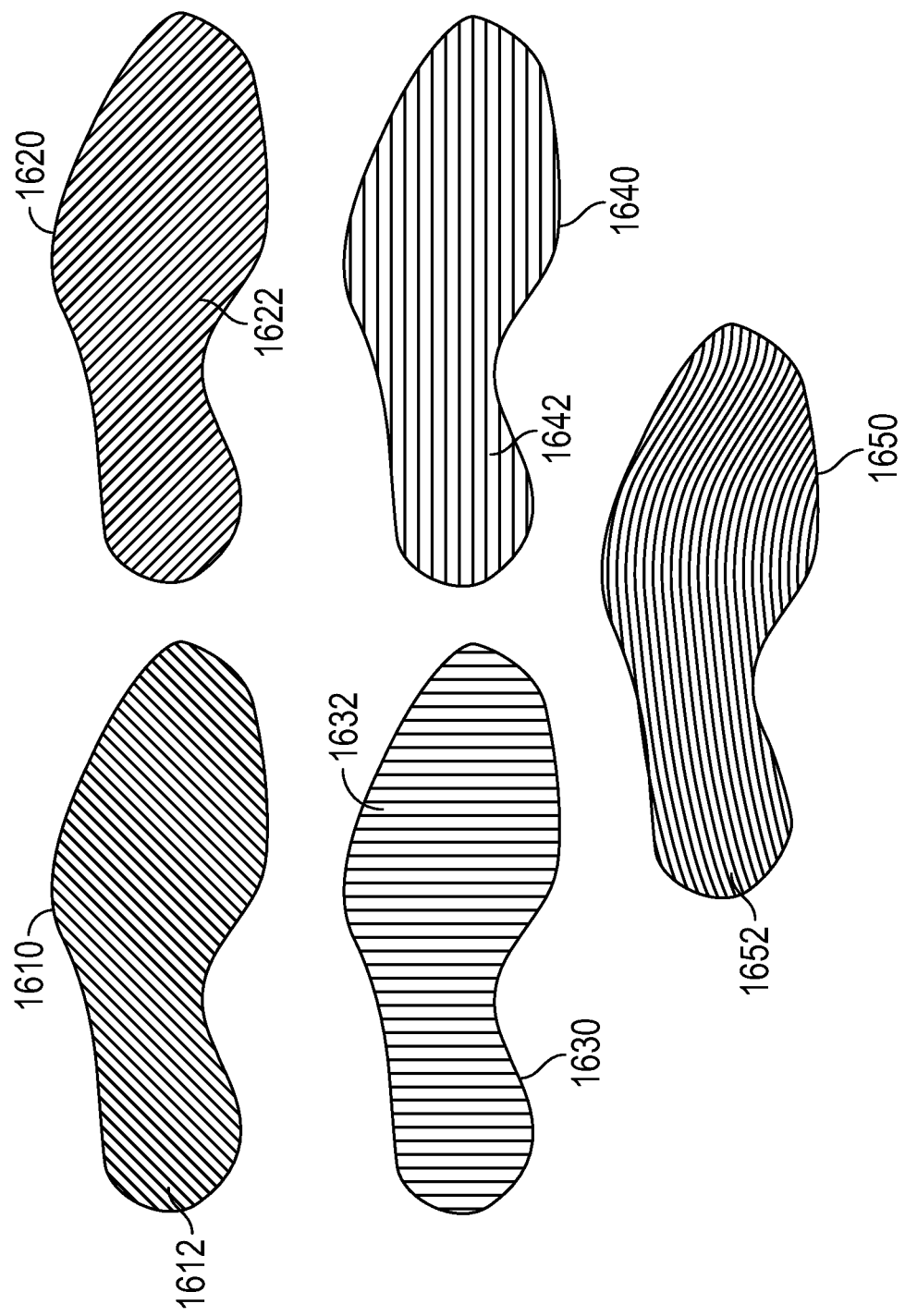
FIG. 16 provide examples of different layers in an item of footwear having different fiber directions in different layers.

In certain embodiments, utilizing curved layer technology in the insole production process also may provide the ability to more precisely control the mechanical properties of the insole. For example, the additive manufacturing device may be configured to allow for the direction of the fibers to be selected based on the needed flexibility, torsional rigidity, and sheer strength needed for a specific wear. For example, the fibers in each layer may be set down in a specific direction which is optimally tuned to the pronation of the foot over an entire gait cycle. In some embodiments, the control system of the additive manufacturing device may be configured to allow for specifying the fiber direction on a layer-by-layer basis. FIG. 16 provides examples of different layers in an item of footwear having different fiber directions in different layers.

As shown, a first layer 1610 includes a fiber direction 1612 in which fibers are laid at an angle approximately 45 degrees offset to the length-wise axis of the foot. A second layer 1620 also includes a fiber direction 1622 which is approximately 45° offset from the longitudinal axis of the foot. In this case, it is offset 45° in the opposite direction as that shown in layer 1610. Another layer may include a fiber direction that is perpendicular to the lengthwise axis of the foot. For example, the layer 1630 includes fibers printed perpendicular to the longitudinal axis of the foot. Fibers may also be deposited along the longitudinal axis of the foot as shown in layer 1640. In this layer, the fibers 1642 extend lengthwise from the back of the foot to the front of the foot. Additionally, the fiber direction may be curved as shown in layer 1650. Utilizing a curved fiber direction such as the fiber 1652 shown in layer 1650 may be beneficial for layers which comprise the outer surface of the insole because they will more closely align with the contour of the foot and/or shoe with which the insole is used. Utilizing various combinations of fiber directions, torsion may be controlled within the insole so that the mechanical behavior of the insole is optimized for the particular gait of the wearer. These fiber direction combinations may be determined based on a gait analysis performed on the wearer. Based on the gait analysis, a determination is made regarding the directions in which the insole requires strength and rigidity, and those directions in which the insole should have flexibility to accommodate the needs of the wearer.

Figure 17A:
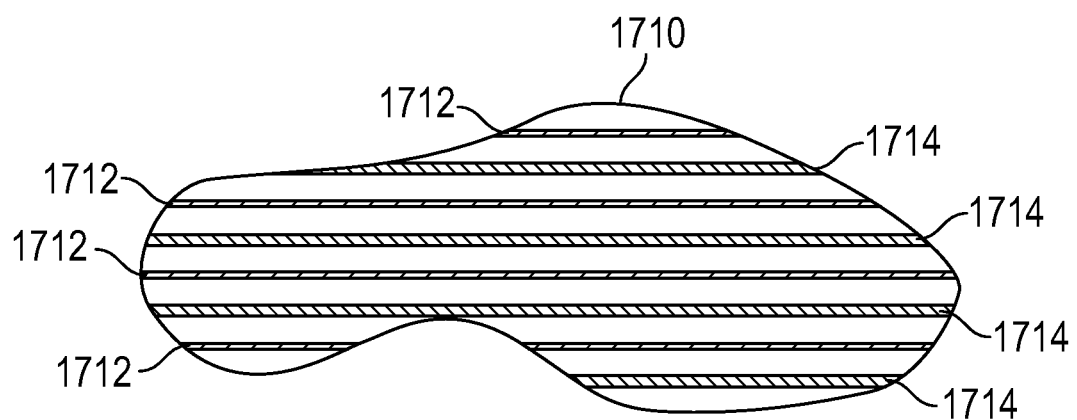
FIGS. 17A-17C provide illustrations of an item of footwear which use different materials for different fibers within a layer.
Figure 17B:
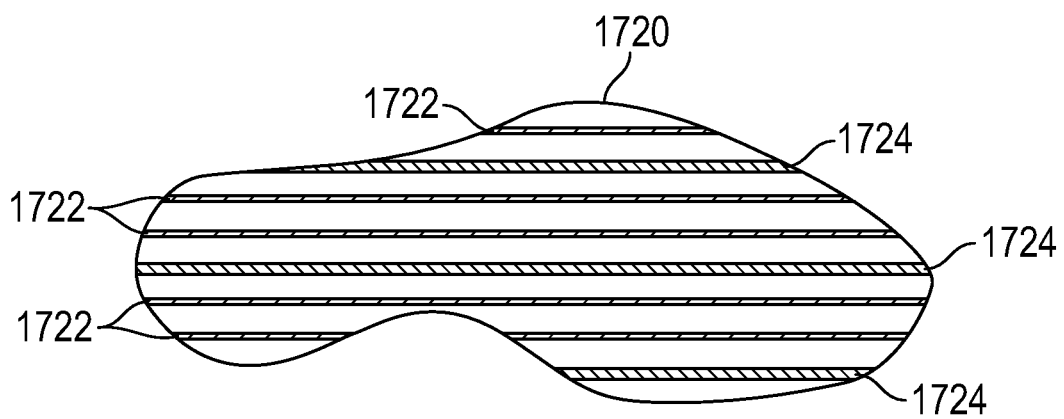
Figure 17C:
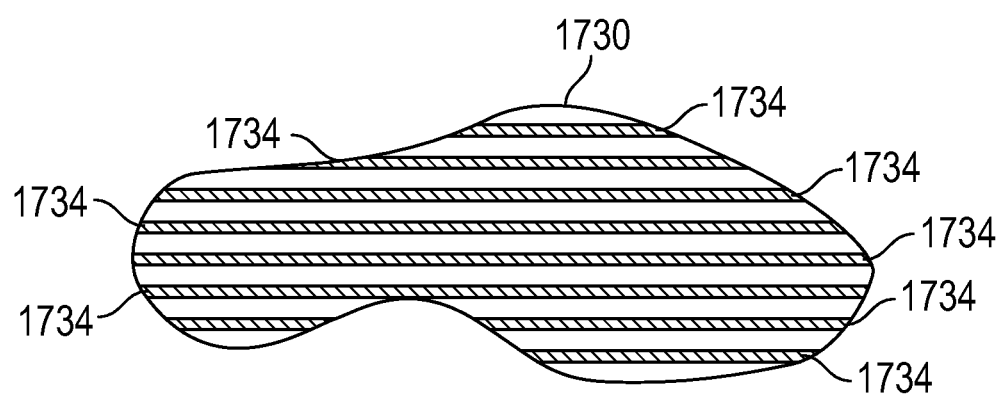

In addition to varying the fiber direction between layers, control over the mechanical properties of the insole may also be achieved by utilizing different materials between layers, or even between different fibers within a layer. Typically, a dual nozzle machine will be configured such that one nozzle extrudes a first material (such as the base material for the insole, for example) and the second nozzle extrudes a second material (such as a carbon-like filament for reinforcement of the layer, for example). Turning now to FIGS. 17A-17C, examples of intra-layer variations of fiber materials are shown. FIG. 17A shows a layer 1710 of an insole having two different fiber materials. In this example, a first material 1712 and a second material 1714 are deposited in an alternating fashion. As a result, half of the deposited fibers are in the first material 1712 and the other half of the deposited fibers are the second material 1714.

Figure 17D:
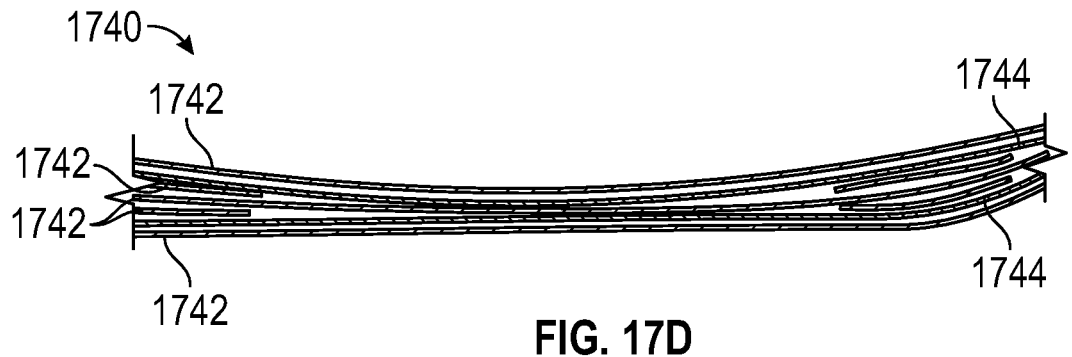
FIG. 17D provides an illustration of an item of footwear which has different materials in different layers.

FIG. 17B provides another example of how variations in fiber material layers may be used to provide a particular property such as directional flexibility or strength. In this example, the layer 1720 of an insole also includes two different fiber materials. The first fiber material 1722 comprises the majority of deposited fibers (in this example, five of the eight deposited fibers). The second fiber material 1724 is used in the remaining three deposited fibers. FIG. 17C provides an example of a layer 1730 in which all of the fibers are deposited in a single material 1734. This material 1734 may be a reinforcement material such as a carbon-like filament that is used to provide a strengthening layer in the insole. In addition to varying materials used within layers, the item of footwear may also vary materials used between different layers. FIG. 17D provides an illustration of a cross-section view of an item of footwear 1740 which has different materials in different layers. In this example, two different materials are used. The first material 1742 is used in the top, bottom, and middle layers as shown. Additionally, the first material 1742 is used in the conforming layers which do not extend the entire length of the insole. The second material 1744 is used in the immediate interior layers adjacent to the outer layer on the top and bottom of the insole 1740. As discussed above in connection with FIGS. 17A-17C, each individual layer may be comprised of varying fiber materials between individual deposited fibers. Thus, while FIG. 17D shows one cross-section of the insole 1740, another cross-section of the insole 1740 may have a different combination of fiber materials.

In some embodiments, the different materials used in and among layers of the insole may be comprised of a conductive material. In these embodiments, the deposition of curved layers (e.g., using prefabricated supports) allows for the insertion of continuous circuitry into the insole. For example, a curved layer polymer material may be used to surround a conductive material layer in the insole. The conductive material layer may be a conductive electronic track which is printed directly as part of the insole itself. The conductive layer may be utilized as a sensor used for monitoring. For example, it could be used to monitor athletic performance. It may also be used to monitor more general use to ensure that the insole is a proper fit for the wearer over time. Additionally, the conductive layer may further be used to solve issues relating to static electricity as described in U.S. Pat. No. 5,233,769.

Figure 18:
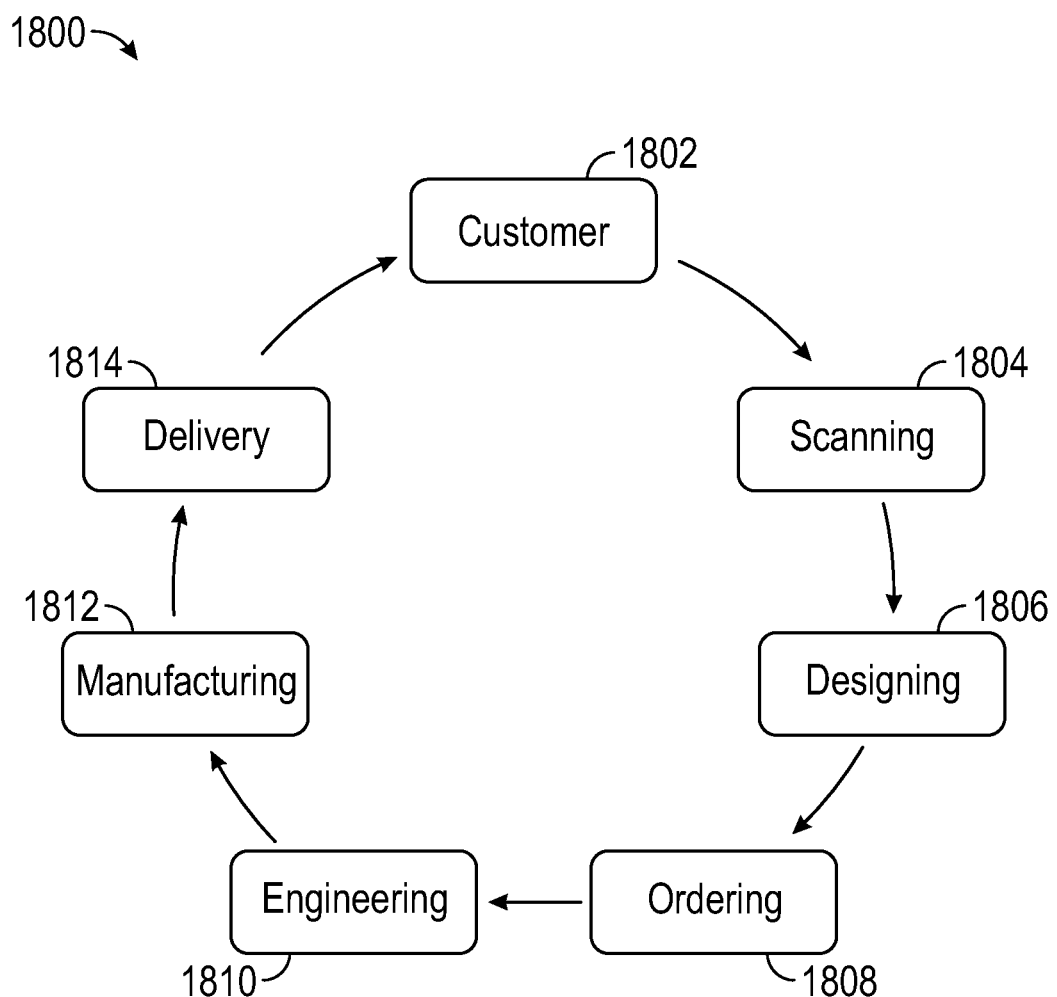
FIG. 18 is high level diagram of the process by which an item of footwear may be designed and manufactured according to embodiments disclosed herein.

FIG. 18 is high level diagram of a production and distribution lifecycle 1800 by which an item of cushioning may be designed and manufactured according to embodiments disclosed herein. As shown, the lifecycle 1800 is circular in nature, as the various steps undertaken in the design and manufacture of items of cushioning may be repeated several times for any particular user of the object. The lifecycle 1800 begins with the customer 1802 having a need for an improved item of cushioning. The process then moves to block 1804, where the anatomy of the user that will be in contact with the cushion is scanned or otherwise tested to obtain anatomical, pressure maps and gait-related data about the user. The process next moves to block 1806 where the item of cushioning may be designed based on the information obtained during the scanning process 1804. The design process 1806 may be performed by the customer using an online cushion design application. In some embodiments, the cushion design application may be configured to allow the customer to specify certain design elements regarding their item of cushioning. For example, if the cushion is in footwear and if the item of footwear is an orthotic sandal, attributes such as tread design, color, material, or some other attributes may be specified by the customer 1802.

Once the customer has finished the design process 1806, the process moves to the ordering process 1808. The ordering process 1808 may take the design specified by the customer 1802 during the design process 1806 and send that information to an engineering process 1810 upon receiving a confirmed order from the customer 1802. The engineering process 1810 involves utilizing the specified design to create a 3-D model for an item of cushioning that meets the design specifications provided by the customer 1802 during the design process 1806, and also conforms to the anatomy of the customer 1802 based on the scanning data obtained during the scanning process 1804. Once a 3-D model has been created during the engineering process 1810, the process moves to 1812 where the item of cushioning is manufactured using additive manufacturing. As noted above, the item of cushioning may be manufactured using curved layer fused deposition modeling, and the fiber materials within and between layers may be varied as described above in connection with FIGS. 14A-17D. Further, the item of cushioning may be manufactured utilizing one or more prefabricated support structures as described herein. Once the item of cushioning has been manufactured, a delivery process 1814 is undertaken, whereby the item of cushioning reaches the customer 1802. The customer may then utilize the item of cushioning. For example, if the item of cushioning is an insole, the insole may be inserted into a shoe of the customer 1802.

In some embodiments, the lifecycle 1800 may repeat multiple times for a particular customer 1802. As discussed above, in certain embodiments, items of cushioning created using the techniques described herein may include continuous circuitry which is deposited during the additive manufacturing process. This circuitry may include sensors which can record information regarding pressure points within the insole, including changes in those pressure points which may occur over time. When the sensors detect significant changes in the pressure map, the sensors may be configured to alert the user that the item of cushioning is no longer an optimal fit, and that a new scanning process 1804 should take place with respect to the affected anatomy.

Figure 19:
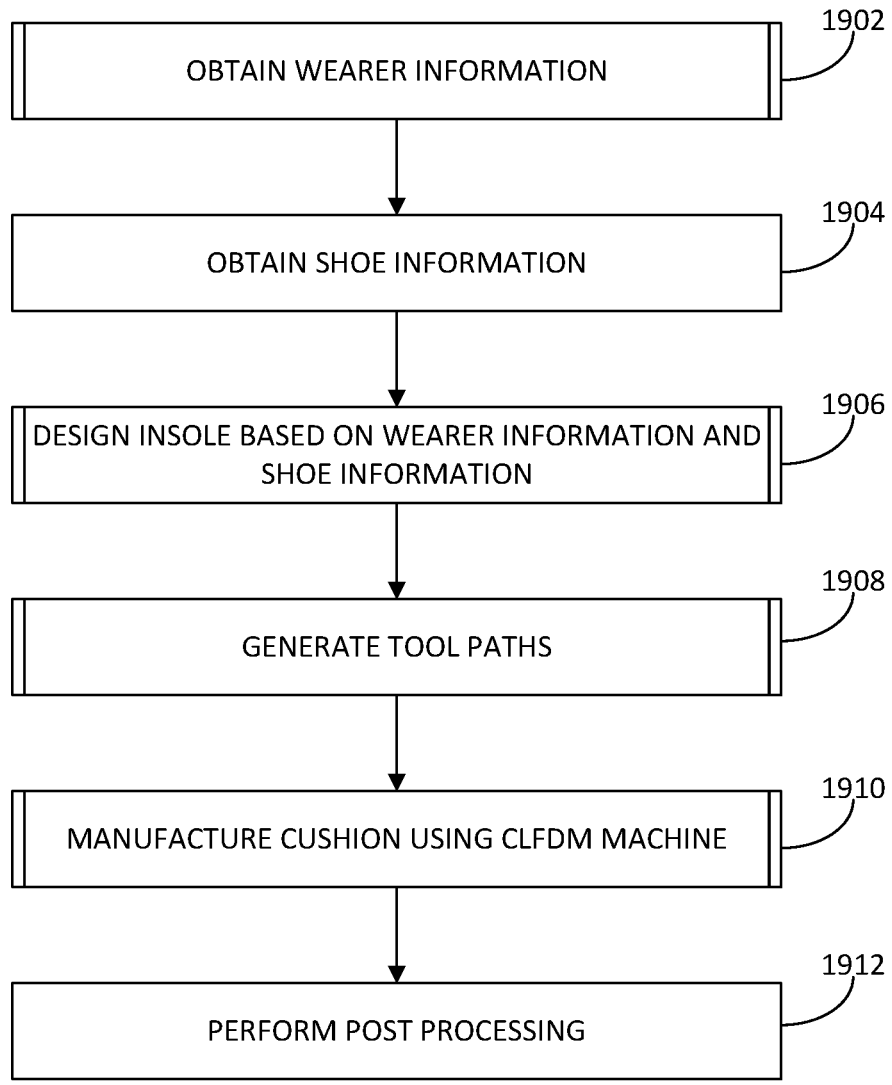
FIG. 19 is a flow chart showing a method for designing and manufacturing an item of footwear according to one or more embodiments.

In the lifecycle 1800 described in connection with FIG. 18, an item of cushioning may be designed, ordered, engineered, and manufactured to best conform to the anatomy of the user. Turning now to FIG. 19, a flow chart illustrating a more detailed view of the design and manufacturing process is provided. In this particular example, the item of cushioning been designed and manufactured is a cushion, although a skilled artisan will appreciate that according to the process shown in FIG. 19 other types of cushioning may also be manufactured.

The process begins at block 1902 where information about the anatomy of the user is obtained. As will be discussed in additional detail below in connection with FIG. 20, this information may be obtained via (e.g., medical) imaging or other types of sizing and/or measurement of the anatomy of the user (e.g. foot in case of footwear). Once information regarding the anatomical structure of the wearer has been obtained, the process moves to block 1904. There, information about the object in or on which the cushion will be used is obtained. For example, in case of footwear this information may include the specific type of shoe, the structure of the shoe, the size of the shoe, the material used in the shoe, or some other type of information. In some embodiments, the shoe itself may be scanned to obtain precise structural information, although in other embodiments less detailed information may suffice.

Once the cushioning information has been obtained, the process may then move to block 1906. There, the cushion may be designed based on the user's information and the object information obtained in blocks 1902 and 1904, respectively. This design process will be described in additional detail below in connection with FIG. 21. Next, the process moves to block 1908. There, tool paths are generated for the manufacture of the cushion. As discussed above, the tool path may be a three axis tool path which allows the additive manufacturing device (such as a fused deposition modeling device, for example) to deposit curved layers in accordance with the insole design provided by block 1906. Additional details about the tool path generation process will be provided below in connection with FIG. 22.

Once the tool paths have been generated, the process may then move to block 1910. There, the cushion is manufactured using a curved layer additive manufacturing machine. Generally, the curved layer additive manufacturing machine will take the form of a CLFDM device, but it is to be appreciated that other types of additive manufacturing technologies which allow for three axis tool paths may also be used to manufacture the cushion. In some embodiments, prefabricated support structures may be used to manufacture the cushion. These additive manufacturing technologies may include robotic extrusion, for example. Additional details about the manufacturing process of block 1910 will be discussed below in connection with FIG. 23. Once the cushion has been manufactured using curved-layer technology, the process then moves to block 1912 where post-processing is performed. The post-processing may include anyone of various types of finishing, including sanding, smoothing, coloring, cleaning, surface treatments, and the like. For example, post-processing may include removing a prefabricated support structure from the cushion. The prefabricated support structure may be then be reused. Upon completion of the post-processing in block 1912, the manufacturing of the cushion may be complete.

Figure 20:
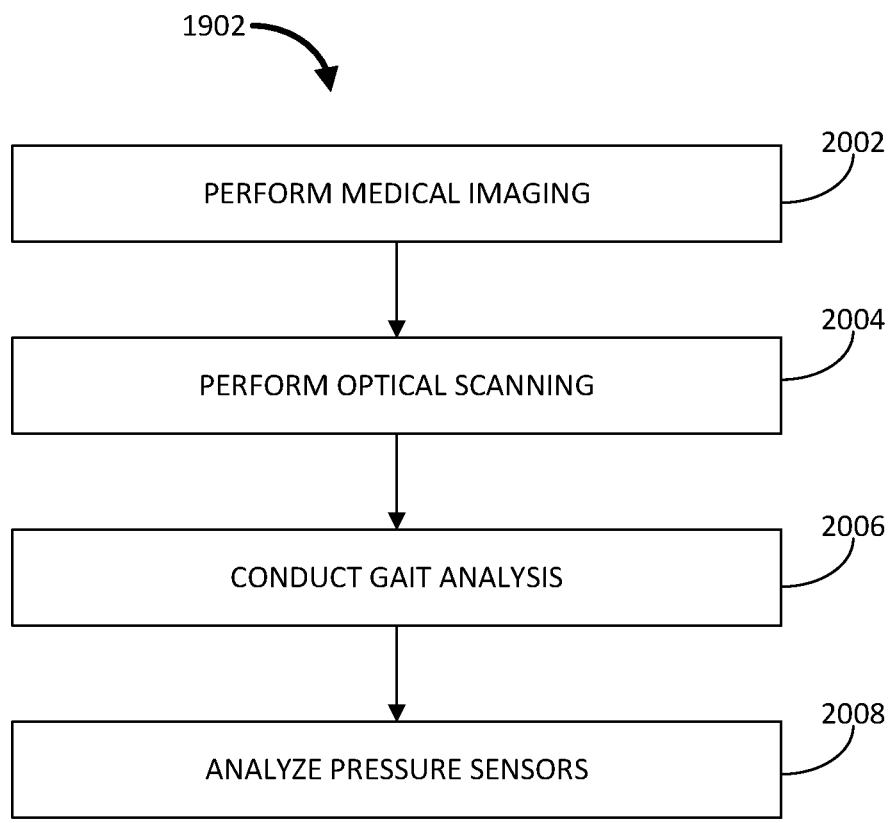
FIG. 20 is a flow chart providing a more detailed view of the user information gathering step from FIG. 19.

As discussed above in connection with block 1902 of FIG. 19, user information may be obtained in order to begin the process of designing a user-specific cushioning in accordance with embodiments disclosed herein. FIG. 20 is a flow chart providing a more detailed view of the user information gathering step from FIG. 19. The user information gathering begins at block 2002, where imaging is performed on the relevant anatomy of the user. The imaging may be any one or more of various modalities, including x-ray, CT, MRI, or some other (e.g., medical) imaging technology. Using the imaging, information about the anatomical structure of the part of the body that will be in contact with the cushion may be obtained (example the foot in case of footwear), and used to assist in the design process. The process of gathering user information may also include optical scanning as shown in block 2004. The optical scanning may include taking laser scans of the anatomy with a laser to capture a 3 dimensional image which measures the anatomy contours and dimensions with great precision. In addition to performing imaging and optical scanning, the gathering of user information may also include gait analysis and or pressure analysis as shown in block 2006. The gait analysis may be a computerized gait analysis in which the user walks across a pressure plate which feeds pressure information data in order to detect abnormal foot function. In addition, the gathering of user information may also include an analysis of pressure maps created in the course of conducting the gait analysis, as shown in block 2008.

Figure 21:
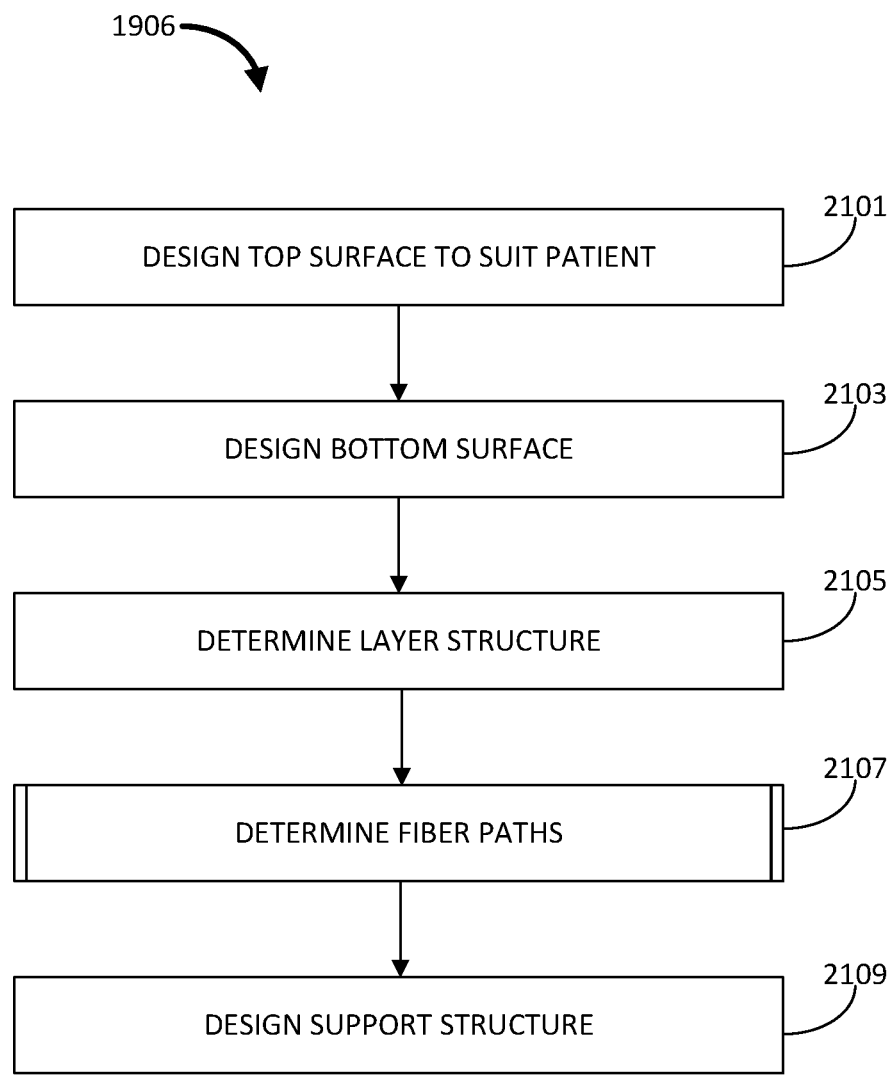
FIG. 21 is a more detailed view of the design step from FIG. 19.

As discussed above in connection with block 1906 of FIG. 19, a cushion may be designed using the user information obtained as well as object information relating to the object in or on which the cushion will fit. FIG. 21 is a more detailed view of the cushioning design step from block 1906 of FIG. 19. The design process begins at block 2101, where the top surface of the cushion is designed to suit the user's anatomical structure and pathology. The top surface may be designed so that it generally conforms to the contour of the anatomy with which the cushion will be used. The optical scan information and imaging information obtained in the sub process described in FIG. 20 may be used to determine the optimal design for the top surface. Once the top surface of the cushion has been designed, the process continues at block 2103. There, the bottom surface of the cushion is designed. Generally, the bottom surface is designed based on the information obtained about the object in or on which the cushion will fit. In case of footwear, the bottom surface may be designed to best fit within and against the outsole or foot bed of the shoe. The process continues at block 2105, where the layer structure is determined. The layer structure may be selected based on desired mechanical properties of the cushion in each direction. The layer structure may be one of the layer structures described above in connection with FIGS. 15A-15C above, such that curved layers may be utilized having an infill based on anyone of the top layer, the bottom layer, or both.

Once the layer structure has been designed, process then moves to block 2107 where the fiber paths are determined. As noted above, the fibers in each layer may be printed in a specific direction. The direction in which the fibers are deposited can influence and/or affect the strength of the cushion in a particular direction. In addition, and as described above in connection with FIG. 16, two or more different fiber directions may be selected for different layers in order to achieve desired flexibility, torsional rigidity, and/or sheer strength within the insole. In addition, and as discussed above in connection with FIGS. 17A-17D, multiple materials may also be used between different fibers within a layer. These different materials may also be incorporated into the cushioning design process. The process then moves to block 2109. There, a support structure may be designed which is used to support the cushion during the additive manufacturing process. In some embodiments, the cushion may use a pre-existing or prefabricated support structure as discussed herein. The support structure may be manufactured using a different material than the cushion so that it can be easily separated from the cushion during the finishing process. In some embodiments the cushion may utilize an adaptive support comprised of a series of blocks which are integrated into the build platform such that they may be raised or lowered to provide an adaptive support apparatus. In some embodiments, a pre-existing support structure may be utilized based on the type of object for which the cushion is being manufactured. For example, various well-known shoe models may each have a dedicated pre-existing support structure that may be inserted into the additive manufacturing device prior to the build process.

Figure 22:
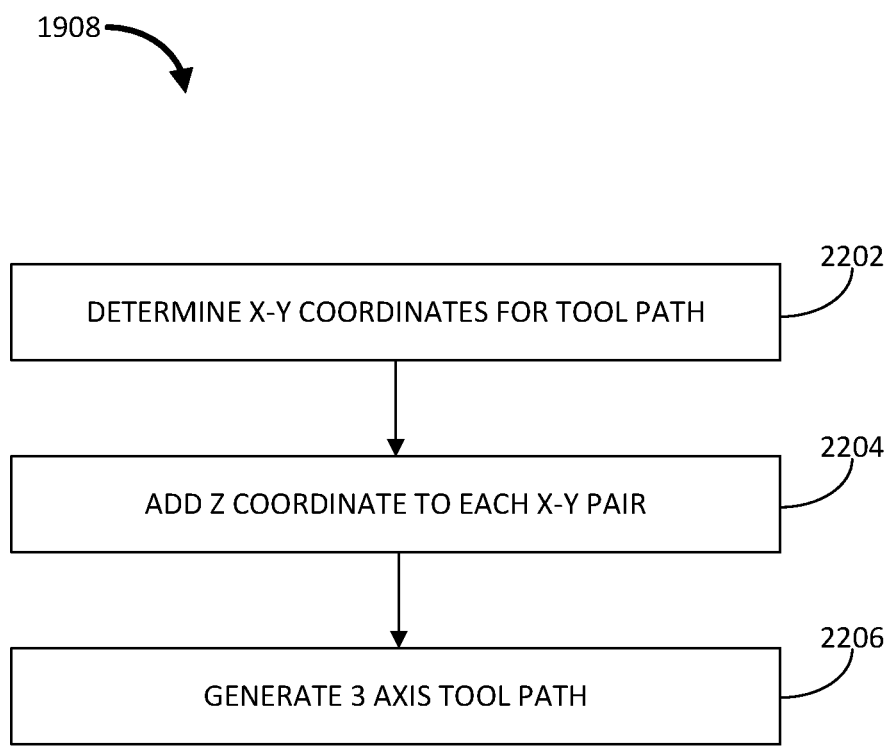
FIG. 22 is a more detailed view of the tool path generation step from FIG. 19.

Turning now to FIG. 22, a more detailed view of the tool path generation step shown in block 1908 of FIG. 19 is shown. The process of generating the tool path may begin at block 1902, where X-Y coordinates are determined for the tool path. As noted previously, various layers within the cushion may be conformal (e.g., curved) layers which are created through three-axis movement by the extrusion nozzles in the additive manufacturing device. Accordingly, at block 2204, a Z coordinate is added to each X-Y pair. Once the Z coordinate has been added to each X-Y pair, the process moves to block 2206. There a three-axis tool path is created based on each of the coordinates defined in blocks 2202 and 2204.

Figure 23:
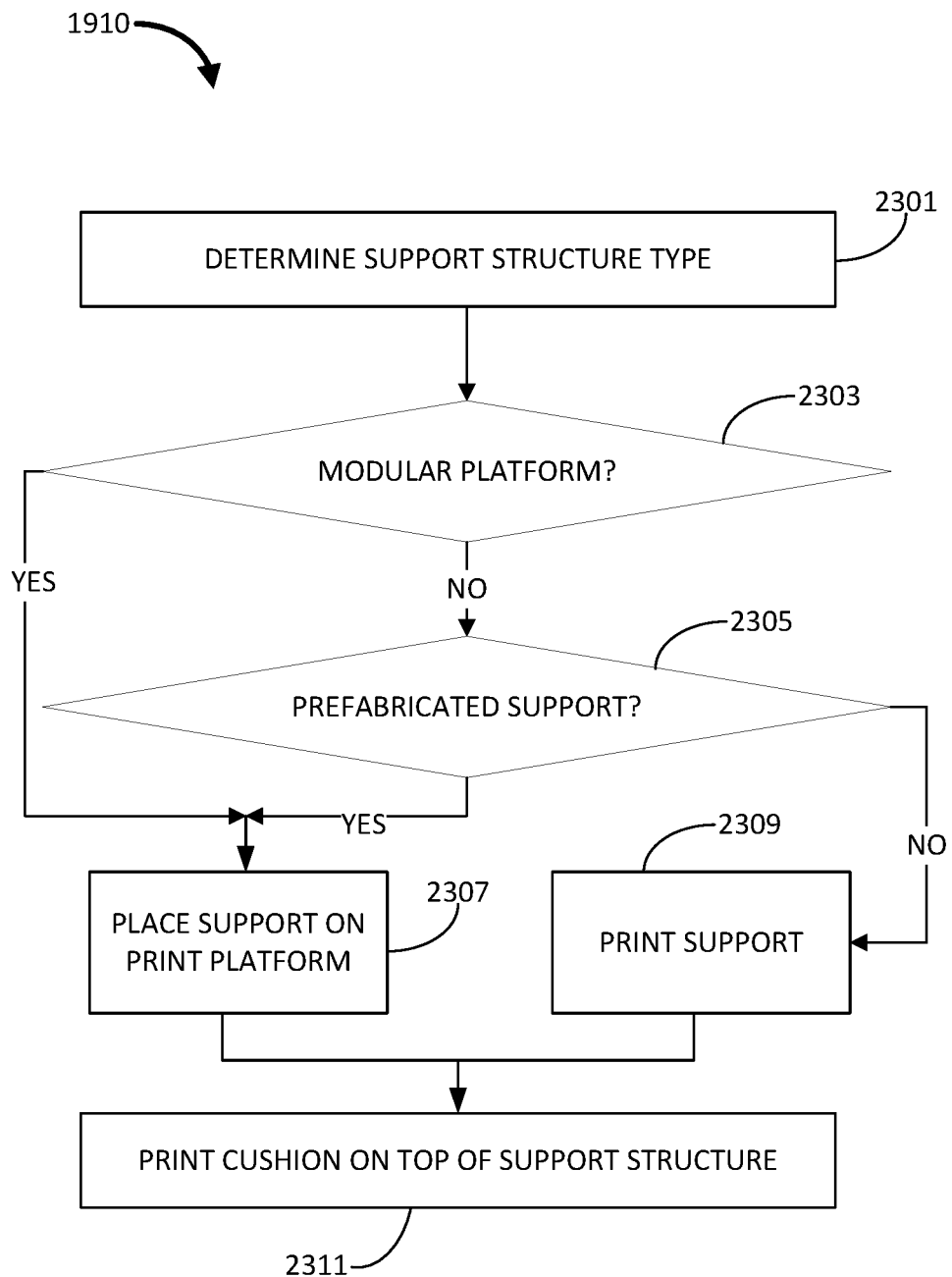
FIG. 23 is a more detailed view of the manufacturing step from FIG. 19.

As discussed a connection with block 1910 of FIG. 19, once the tool paths have been generated, the cushion (for example, an insole) may be manufactured using conformal layers in an additive manufacturing device such as a CLFDM device. FIG. 23 is a more detailed view of the manufacturing process. The process begins at block 2301 where the support structure type is identified. As noted above in FIG. 21, the support structure may be any of various types of fort support structures such as modular platforms, prefabricated supports, or traditional supports. After determining the support structure type, the process moves to decision block 2303 where it is determined whether the support structure type is a modular platform. If so, the process moves ahead to block 2307, where the modular platform is adjusted in accordance with the cushion support design. If the support structure type is not a modular platform, the process moves to decision block 2305 where it is determined whether a prefabricated support is part of the insole design. If so, the process moves again to block 2307 where the prefabricated support is placed on the print platform. If, however, at decision block 2305 it is determined that a prefabricated support is not to be used, the process instead moves to block 2309 where the support structure is printed using the additive manufacturing device. Once the support has been placed on the print platform (as depicted in block 2307) or the support structure has been printed (as depicted in block 2309), the process then moves to block 2311. There, the cushion is printed on top of the applicable support structure.

Various embodiments disclosed herein provide for the use of a computer control system. A skilled artisan will readily appreciate that these embodiments may be implemented using numerous different types of computing devices, including both general purpose and/or special purpose computing system environments or configurations. Examples of well-known computing systems, environments, and/or configurations that may be suitable for use in connection with the embodiments set forth above may include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. These devices may include stored instructions, which, when executed by a microprocessor in the computing device, cause the computer device to perform specified actions to carry out the instructions. As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

Aspects and embodiments of the inventions disclosed herein may be implemented as a method, apparatus or article of manufacture using standard programming or engineering techniques to produce software, firmware, hardware, or any combination thereof. The term "article of manufacture" as used herein refers to code or logic implemented in hardware or nontransitory computer readable media such as optical storage devices, and volatile or non-volatile memory devices or transitory computer readable media such as signals, carrier waves, etc. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

By utilizing the prefabricated support structure described above, significant improvements in the efficiency and object quality of 3D printed objects is achieved. The use of prefabricated support structures results in reduced or even eliminated waste of materials because the prefabricated supports are reusable. The use of prefabricated supports also allows for single nozzle 3D printers to be used more effectively because a single-nozzle printer can be configured extrude different materials for the model and the support. Because the support and the object are not printed at the same time, the most suitable material can be selected for each, and the need for compromises in materials selection is reduced. Moreover, by utilizing different materials for the support and the object itself, the support and the model do not need to be printed in a single build process. Because they can be printed and separate build processes, a separating layer may be inserted between the support and the model which makes it easier to separate them after the object has been printed. By making the separation of the object from the model easier, the printed object has fewer surface imperfections and the need for post-processing is reduced.

What is claimed is:

1. An item of cushioning produced using an additive manufacturing device, comprising:
    a plurality of curved layers each formed by the additive manufacturing device, wherein at least one curved layer conforms to a curved shape of an outer surface of the item of cushioning;
    embedded wires within the plurality of curved layers, wherein the embedded wires follow curvature of the plurality of curved layers; and
    a first area with a first thickness and a second area with a second thickness, wherein the first area has a greater thickness than the second area and comprises a greater number of curved layers than the second area.

2. The item of cushioning of claim 1, wherein variance in thicknesses in the first area and second area is achieved using an infill method, and wherein infill layers are provided in the first area of the item of cushioning that has the greater thickness.

3. The item of cushioning of claim 2, wherein a curvature of the infill layers is based on a stress analysis.

4. The item of cushioning of claim 2, wherein a curvature of the infill layers is based on at least one of a top layer of the item of cushioning and a bottom layer of cushioning.

5. The item of cushioning of claim 1, wherein at least one of the plurality of curved layers comprises a plurality of fibers.

6. The item of cushioning of claim 5, wherein the plurality of fibers includes fibers comprising a first material and fibers comprising a second material.

7. The item of cushioning of claim 6, wherein one of the first material and the second material is a reinforcement material.

8. The item of cushioning of claim 7, wherein the reinforcement material comprises a carbon filament material.

9. The item of cushioning of claim 1, wherein the plurality of curved layers comprises a plurality of fibers, and wherein in a first layer of the plurality of curved layers, the plurality of fibers includes fibers comprising a first material, and wherein in a second layer of the plurality of curved layers, the plurality of fibers includes fibers comprising a second material.

10. The item of cushioning of claim 9, wherein in a third layer of the plurality of curved layers, the plurality of fibers includes fibers comprising the first material and fibers comprising the second material.

11. The item of cushioning of claim 1, wherein a first layer of the plurality of curved layers comprises a plurality of fibers comprising a first material, and wherein a second layer of the plurality of curved layers comprises a plurality of fibers comprising a second material.

12. An item of cushioning produced using an additive manufacturing device, comprising:
    a plurality of curved layers each formed by the additive manufacturing device, wherein at least one curved layer conforms to a curved shape of an outer surface of the item of cushioning; and
    a first area with a first thickness and a second area with a second thickness, wherein the first area has a greater thickness than the second area and comprises a greater number of curved layers than the second area, wherein each of the plurality of curved layers comprises a plurality of fibers, and wherein the plurality of fibers in a first layer are deposited in a first direction, and wherein the plurality of fibers in a second layer are deposited in a second direction.

13. The item of cushioning of claim 12, wherein the first direction is perpendicular to a longitudinal axis of the item of cushioning, and wherein the second direction is parallel to a longitudinal axis of the item of cushioning.

14. The item of cushioning of claim 12, wherein the first direction is 45 degrees offset the longitudinal axis of the item of cushioning, and wherein the second direction is 45 degrees offset the longitudinal axis of the item of cushioning and perpendicular to the first direction.

15. The item of cushioning of claim 12, wherein the first direction is between 10 degrees and 80 degrees offset in the longitudinal axis of the item of cushioning, and wherein the second direction is between 10 degrees and 80 degrees offset the longitudinal axis of the item of cushioning.

16. The item of cushioning of claim 1, wherein the embedded wires are part of sensors.

17. The item of cushioning of claim 16, wherein the sensors comprise pressure sensors.

18. The item of cushioning of claim 16, wherein the sensors are adapted to monitor structural integrity of the item of cushioning.

* * * * *